(12) United States Patent
Piszczek et al.

(10) Patent No.: US 9,477,551 B1
(45) Date of Patent: Oct. 25, 2016

(54) METHOD AND SYSTEM FOR DATA MIGRATION BETWEEN HIGH PERFORMANCE COMPUTING ARCHITECTURES AND FILE SYSTEM USING DISTRIBUTED PARITY GROUP INFORMATION STRUCTURES WITH NON-DETERMINISTIC DATA ADDRESSING

(71) Applicant: DATADIRECT NETWORKS, INC., Chatsworth, CA (US)

(72) Inventors: Michael J. Piszczek, Laurel, MD (US); Jason M. Cope, Highland, MD (US); Paul J. Nowoczynski, Brooklyn, NY (US); Pavan Kumar Uppu, Woodbine, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 224 days.

(21) Appl. No.: 14/556,571

(22) Filed: Dec. 1, 2014

(51) Int. Cl.
    *G11C 29/00* (2006.01)
    *G06F 11/10* (2006.01)
    *G06F 17/30* (2006.01)

(52) U.S. Cl.
    CPC ..... *G06F 11/1076* (2013.01); *G06F 17/30079* (2013.01)

(58) Field of Classification Search
    CPC ........... G06F 11/1076; G06F 11/1008; G06F 11/1004; H05K 999/99; G11B 20/1833
    USPC ......................................................... 714/766
    See application file for complete search history.

(56) References Cited

U.S. PATENT DOCUMENTS

| | | | |
|---|---|---|---|
| 4,009,344 A * | 2/1977 | Flemming | H04Q 11/04 370/321 |
| 8,086,794 B2 | 12/2011 | Fellinger et al. | |
| 8,843,805 B1 * | 9/2014 | Goel | G11C 7/24 714/763 |
| 2014/0108473 A1 | 4/2014 | Nowoczynski et al. | |
| 2014/0108707 A1 | 4/2014 | Nowoczynski et al. | |
| 2014/0108723 A1 | 4/2014 | Nowoczynski et al. | |
| 2014/0108863 A1 | 4/2014 | Nowoczynski et al. | |
| 2014/0351300 A1 | 11/2014 | Uppu et al. | |

* cited by examiner

*Primary Examiner* — Albert Decady
*Assistant Examiner* — Enam Ahmed
(74) *Attorney, Agent, or Firm* — Rosenberg, Klein & Lee

(57) ABSTRACT

The present invention is directed to data migration, and particularly, Parity Group migration, between high performance data generating entities and data storage structure in which distributed NVM arrays are used as a single intermediate logical storage which requires a global registry/addressing capability that facilitates the storage and retrieval of the locality information (metadata) for any given fragment of unstructured data and where Parity Group Identifier and Parity Group Information (PGI) descriptors for the Parity Groups' members tracking, are created and distributed in the intermediate distributed NVM arrays as a part of the non-deterministic data addressing system to ensure coherency and fault tolerance for the data and the metadata. The PGI descriptors act as collection points for state describing the residency and replay status of members of the Parity Groups.

33 Claims, 8 Drawing Sheets

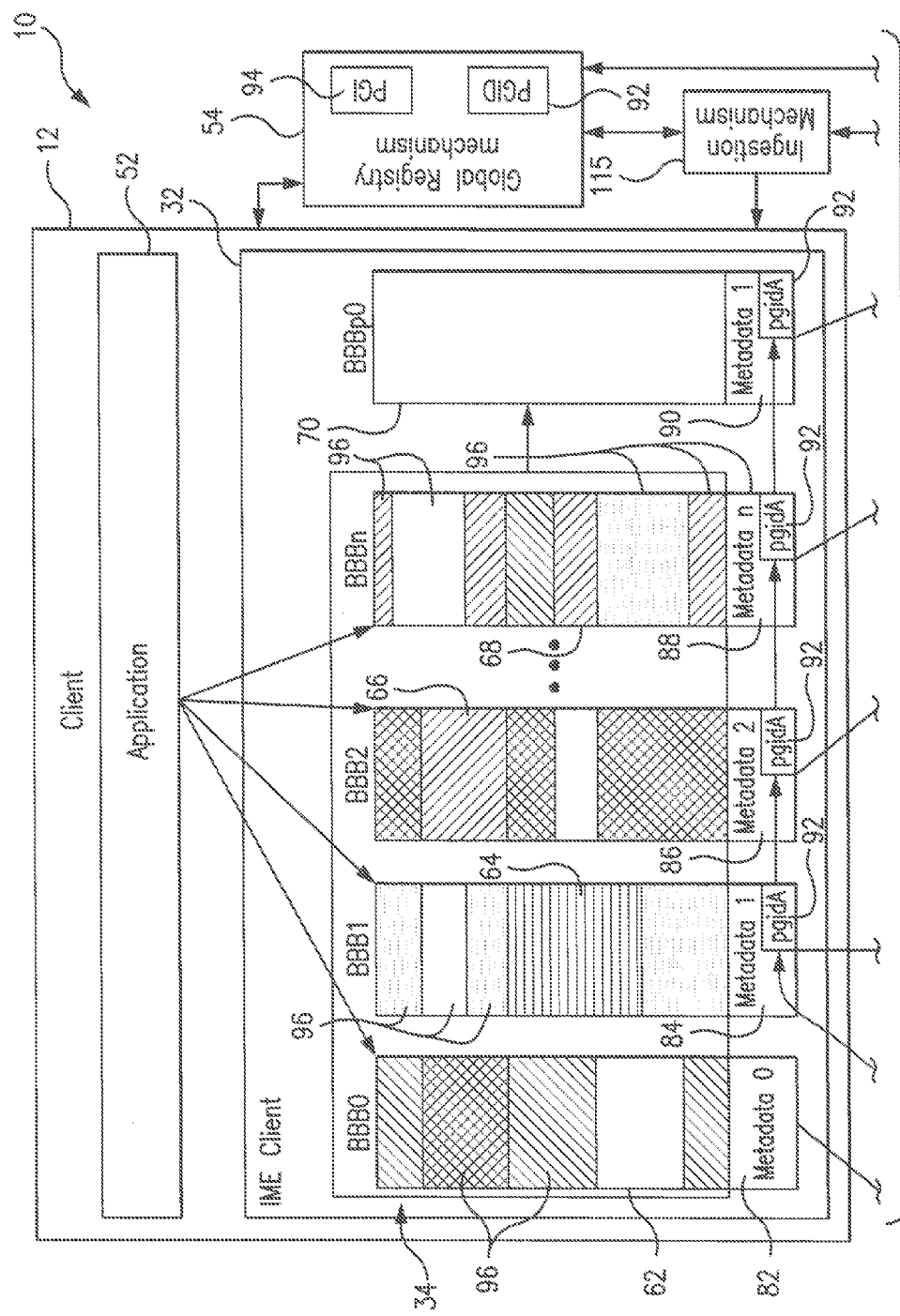
FIG. 2A1

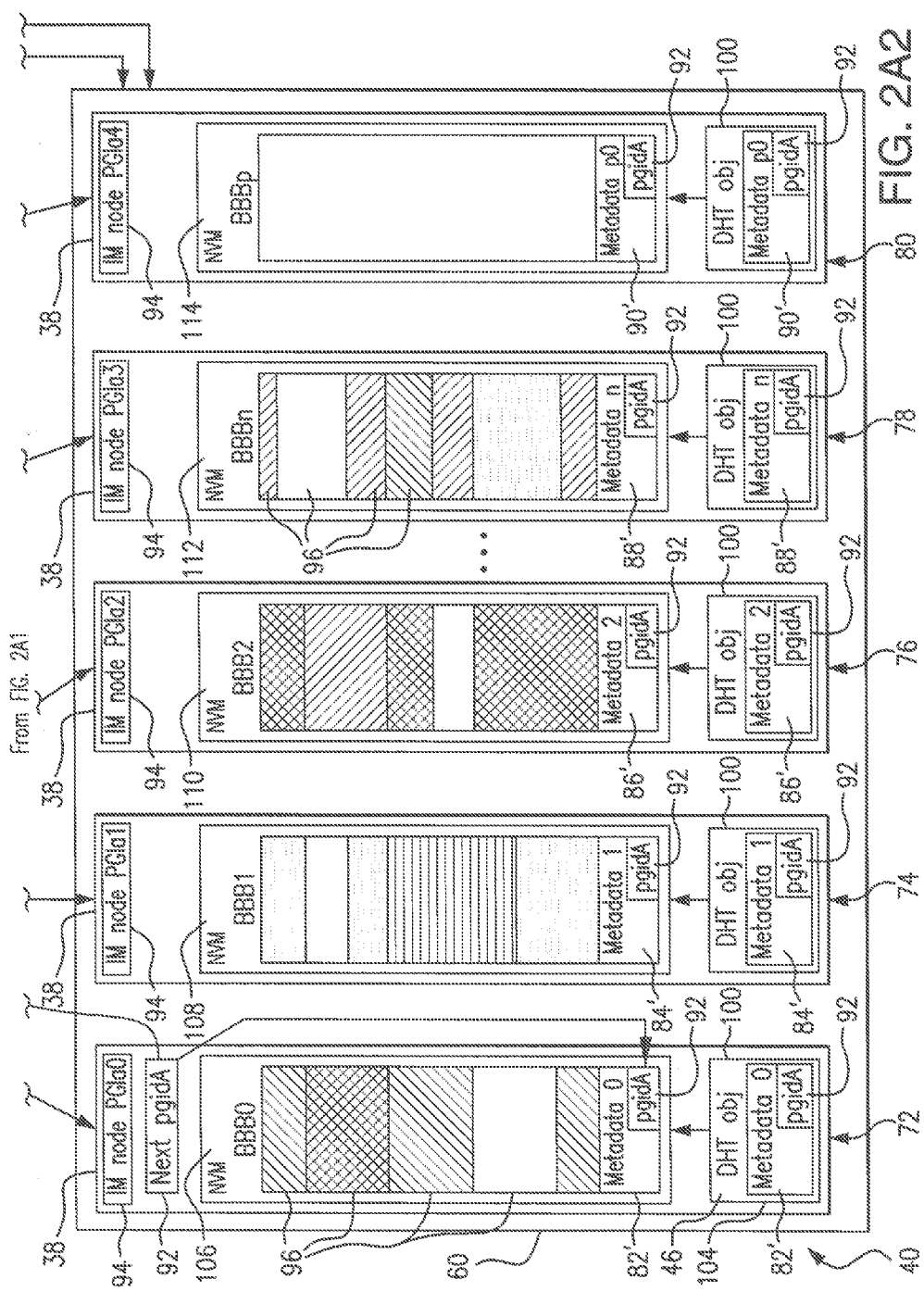

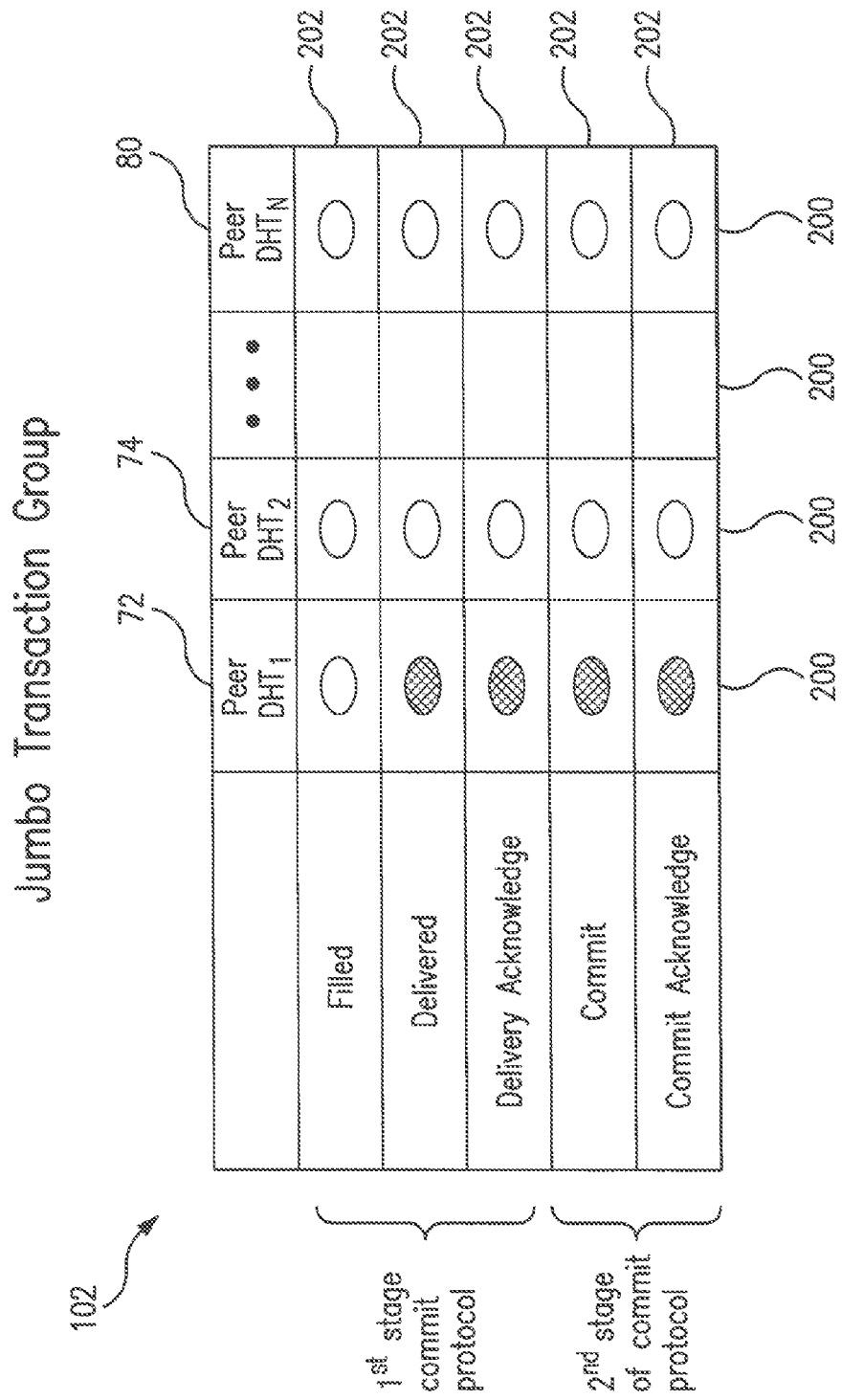

METHOD AND SYSTEM FOR DATA MIGRATION BETWEEN HIGH PERFORMANCE COMPUTING ARCHITECTURES AND FILE SYSTEM USING DISTRIBUTED PARITY GROUP INFORMATION STRUCTURES WITH NON-DETERMINISTIC DATA ADDRESSING

FIELD OF THE INVENTION

The present system and method are directed to data migration between high performance computing cluster architectures (also referred to herein as data generating entities, or clients, as well as compute nodes) and long-term data storage, and in particular, to migration of parity groups between high performance compute nodes and Parallel File System in data storage systems.

More in particular, the present system relates to a data migration system employing a Burst Buffer (BB) tier coupled between the data generating entities and the file system to store parity group structures in the Burst Buffer tier in an expedited manner prior to writing the parity group structures to the File System.

In overall concept, the present system and method embrace the I/O (Input/Output) activity in a data migration system equipped with an intermediate storage tier facilitating in a multi-step data migration process beginning with the client's aggregation of dirty buffers and construction of parity groups therefrom followed by ingestion of the parity groups from the client, i.e., the receipt and temporary storage of the dirty buffers in an unstructured manner in the intermediate storage tier, and subsequent replaying the temporary stored buffers (parity groups) into a File System for long-term (or permanent) storage in an orderly manner, with an ensured fault tolerance for data and metadata, and redundancy for data processing.

In addition, the present system is directed to a data storage system using an Infinite Memory Engine (IME) which is supported by the concept of a Burst Buffer tier, serving as a mediator between high performance computing clients and an existing Parallel File System for long term data storage, in which non-deterministic write methods are combined with inferential data location techniques based on address domains to provide system support for expedited data ingestion into the data storage system combined with a consistent read view of the underlying File System.

Further, the subject system is directed to a data storage system using an intermediate data storage sub-system (BB tier) which exploits a distributed array of Non-Volatile Memory (NVM) devices interconnected via a low-latency infrastructure to enable a fast ingest of Parity Group structures from high performance computers to the NVM devices by storing the data constituting the Parity Group structures in an unstructured manner, and allowing for an orderly, germane egress of the data from the distributed NVM array, through the data restructuring aggregation, to a long-term (or permanent) data storage where it resides in a highly structured format.

The subject system further constitutes a data storage system, in which the use of distributed NVM arrays as a single intermediate logical storage requires a global registry (addressing) capability that facilitates the storage and retrieval of the locality (residency) information (metadata) for any given fragment of unstructured data, where Parity Group Information (PGI) descriptors are created and distributed in the Infinite Memory Engine (IME) supported by the non-deterministic data addressing system, to ensure coherency and fault tolerance for the data and the metadata, and where the PGI descriptors act as collection points for state describing the residency and replay status of Parity Group structures.

BACKGROUND OF THE INVENTION

Storage information in a high performance computing environment presents certain challenges and requires data storage architecture and data migration procedures permitting a high level of efficiency and fault tolerance for the data migrating between the high performance computers and long-term (or permanent) data storage.

Data storage architectures handling high performance computations have been developed, including those described in U.S. Patent Application Publication No. 2014/0108723, filed as a Ser. No. 14/056,265, directed to "Reducing Metadata in a Write-Anywhere Storage Sub-System"; U.S. Patent Application Publication #2014/0108473, filed as a Ser. No. 14/050,156, directed to "Maintaining Order and Fault-Tolerance in a Distributed Hash Table System"; U.S. Patent Application Publication #2014/0108863, filed as a Ser. No. 14/035,913, describing "Handling Failed Transaction Peers in a Distributed Hash Table"; U.S. Patent Application Publication #2014/0108707, filed as a Ser. No. 14/028,292, related to "Data Storage Architecture and System for High Performance Computing"; and patent application Ser. No. 14/045,170, directed to "Method and System for Data Transfer between Compute Clusters and File System".

All these architectures use distributed data storage and a specific addressing system capable of pointing a request (when a file access is requested) to a particular location (or locations) within a group of distributed memories.

For example, a data storage architecture and system for high performance computing (described in the U.S. patent application Ser. No. 14/028,292, filed on 16 Sep. 2013) includes an intermediate storage tier interconnected between a super computer and a primary storage to temporarily store data from the compute nodes of the super computer in the intermediate storage tier.

The intermediate storage is built with Non-Volatile Memory (NVM) units which store data items generated by the compute nodes. The intermediate storage employs Input/Output (I/O) nodes to maintain information on the data items residency in the Non-Volatile Memory units via a hash table distributed among the I/O nodes. The use of a Distributed Hash Table (DHT) allows for quick access to data items stored in the Non-Volatile Memory units.

Although mentioning the possibility of storing Parity Group Information (PGI) in the DHT, the specifics of Parity Groups migration between the high performance compute nodes and the permanent storage, or details on creation and distribution of the Parity Group Information (PGI) descriptors for non-deterministic data addressing, have not been addressed in the prior data storage architectures.

SUMMARY OF THE INVENTION

It is therefore an object of the subject system and method to provide a data storage architecture and a data migration process using an intermediate storage tier operatively coupled between high performance computers and a long-term (or permanent) data storage and permitting fast ingress of unstructured data, built into a Parity Group Structure, from the high performance compute nodes into Non-Volatile Memory (NVM) units in the intermediate storage tier in a distributed manner, and, after restructuring aggregation of the ingested unstructured data, orderly egress of that data from the distributed NVM arrays in the intermediate storage tier to the permanent storage for residing there in a highly structured format.

It is another object of the subject system and method to provide data storage architecture which uses a distributed intermediate storage sub-system, such as a Burst Buffer (BB) tier, between unstructured ingress of data from high performance computers and orderly egress of that data into the permanent storage. This system provides a Parity Group (PG) structure which is constructed by a compute node and ingested into a group of I/O nodes (or I/O servers) constituting a local storage pool within the BB tier, and where a non-deterministic data addressing of the Parity Group is performed through construction and distribution of Parity Group Information (PGI) structures which are used to track members of the Parity Group distributed among the I/O servers in the BB tier.

It is an additional object of the subject concept to provide a data storage system and method for data migration between high performance computing clusters and permanent storage in the most efficient manner by employing an intermediate burst buffer tier composed of NVM arrays and Distributed Hash Table (DHT), where each data block, as well as each parity block (also referred to herein as RAID block), included in a Parity Group is consumed by a different I/O server in a local storage pool composed of the I/O servers (and associated NVMs) for handling a specific Parity Group. Pool-local PGI descriptors are created and distributed for handling the Parity Group in question, to act as collection points describing the residency and replay status of the Parity Group.

In one aspect, the concept embraces a method for data migration between data generating entities and a File System in a data storage system composed of a Burst Buffer (BB) tier operatively coupled between at least one data generating entity and the File System, and configured with a plurality of Burst Buffer Nodes (BBNs) and arrays of Non-Volatile Memory (NVM) units operatively associated with respective BBNs. At least a portion of the plurality of BBNs are arranged in at least one local storage pool.

The method is carried out through the steps of:

initially, composing, by the data generating entity, a Parity Group from the unstructured data fragments to be ingested in the BB tier via the following routines:

filling a plurality of Buffers (also referred to herein as Parity Group buffers) with data fragments produced by the data generating entity and metadata associated with the data fragments, thus forming data blocks $BBB_1$, $BBB_2$, . . . , $BBB_n$, where each of the data blocks is filled with corresponding data fragments and contains the metadata associated with data fragments filling the corresponding data block, applying an error correction code to the data blocks $BBB_1$, $BBB_2$, . . . , $BBB_n$, and forming at least one parity block $BBB_p$ containing the error correction coded data constituting the data blocks $BBB_1$, $BBB_2$, . . . , $BBB_n$, and constructing a Parity Group containing the data blocks $BBB_1$, $BBB_2$, . . . , $BBB_n$, and the at least one parity block $BBB_p$.

The I/O ingestion procedure is further continued through:

sending, from the data generating entity, a "write" request for writing the constructed Parity Group to the BB tier, and assigning a Burst Buffer Node, i.e., the $BBN_1$ from the plurality of Burst Buffer Nodes (BBNs) to handle a "write" request for the first data block $BBB_1$ of the Parity Group in question.

Upon receipt of the "write" request, the assigned Burst Buffer Node $BBN_1$, creates a Parity Group Identifier (PGID) for the subject Parity Group which is an identifier providing a globally unique handle for the Parity Group in question. The PGID resides in a metadata section within the NVM associated with the respective BBN.

The PGID serves as a component of the addressing system and includes the prescribed residency of the Parity Group Information (PGI) structure encoded in the PGID. The $BBN_1$ also creates an initial Parity Group Information (PGI) structure for the data block $BBB_1$. The PGI also constitutes a component of the addressing system, since it includes information associated with each data block $BBB_1$, $BBB_2$, . . . , $BBB_n$, of the Parity Group, as well as their residency, i.e., the associated BBNs in the BB tier containing the data blocks and the parity block of the Parity Group.

The $BBN_1$ continues with the writing the data block $BBB_1$ and the associated metadata to a NVM associated with the $BBN_1$, and sends the PGID to the data generating entity.

Upon receipt of the PGID, the data generating entity attempts to send the remaining data blocks $BBB_2$, . . . , $BBB_n$, and the parity block $BBB_p$ to the BB tier (sequentially or in parallel). In this process, each remaining block of the Parity Group is sent to a respective one of the BBNs, i.e., $BBN_2$, . . . , $BBN_n$, $BBN_p$ for storage.

Following the writing of the Parity Group's members in the respective BBNs, each BBN consuming the block, updates the initial PGI to reflect the storage of each subsequent block $BBB_2$, . . . , $BBB_n$, and $BBB_p$ in a respective NVM unit. During the process of the PGI updating, the updated PGIs are replicated to other BBNs which share the local pool affinity. Once the entire Parity Group is ingested in the BB tier, an updated complete PGI is saved to the NVMs associated with the BBNs which consumed the members of the Parity Group, and may be replicated to other BBNs of the BB tier sharing the same local pool affinity.

If, during the Parity Group ingestion routine, at least one BBN in the local storage pool has failed, the block attempted to be written therein, is resent to another BBN in the pool which has not yet consumed any member of the Parity Group in question, and the PGI is updated accordingly.

The subject process is enhanced by operatively coupling a Distributed Hash Table (DHT) server to the BB tier, where the DHT server includes a plurality of DHT portions, with each DHT portion being maintained by a respective one of the BBNs sharing the local pool affinity. DHT objects are written in respective DHT portions, wherein each DHT object includes the metadata and PGI structure associated with each of the blocks, i.e., $BBB_0$, $BBB_1$, . . . , $BBB_n$, and $BBB_p$ of the Parity Group in question.

Preferably, a Jumbo Transaction Group (JTG) structure is created in the memory of the DHT server, and distributed among the DHT server's portions. The JTG structure holds a list of commands that mutate the DHT server's portions during the I/O ingesting routine.

Specifically, for every member of the subject Parity Group, the DHT objects (metadata and PGI) are placed in the JTG structure, associated with a corresponding BBN. Once the JTG is committed (commit command is issued) at the corresponding BBN, the data generating entity, responsive to the JTG commit, indicates the block "write" as complete.

Upon completion of the subject Parity Group ingestion to the BB tier, the process continues with cleaning the Parity Group buffers in the data generating entity.

During the Parity Group ingestion phase of operation, a Residency Reference Counts Unit (also referred to herein as Structure) counts the number of active references to each DHT object and increments the residency reference counts for each data fragment added to a block ($BBB_1$, $BBB_2$, ..., $BBB_n$) or for each data block ($BBB_1$, $BBB_2$, ..., $BBB_n$) and the parity block $BBB_p$ written into the BB tier.

When operating in a Replay Phase of operation, i.e., during the replay of the Parity Group into the File System, the subject method continues through the steps of:

acquiring, by at least one of the BBNs, the metadata stored in the DHT server portion associated with the data fragments included in the BBN in question, reading the data fragments from the data block BBB in the BBN in question, aggregating the data fragments in a respective buffer in a structured format in accordance with the corresponding metadata, and once the respective buffer is full, committing the structured data fragments to the File System.

For example, for the DHT object which is the PGI, the Residency Reference Counts Structure is arranged as a bitmap representing the blocks of the subject Parity Group added to the PGI during the PGI_update routine.

During the Replay Phase of operation, when the data fragments are replayed to the File System, the subject method continues through the steps of:

decrementing the Residency Reference Structure counts until the reference count for the respective block of the Parity Group in question reaches zero, and clearing the residency reference bit associated with said block of said parity group in the PGI's bitmap.

When the Residency Reference counts reach zero for all the blocks $BBB_1$, $BBB_2$, ..., $BBB_n$, and $BBB_p$ of the Parity Group in question, the PGI is deleted from the BBNs.

If, during the replay phase of operation, data migration experiences a faulty condition, the complete updated PGI is used to track the parity group's blocks needed for data reconstruction.

The PGID includes information on the PGI's residency. Thus, upon obtaining the PGID, the data generating entity has the capability of recreating a copy of the initial PGI, as well as any updated PGI, including the complete PGI, by utilizing the PGID and filling the copy of the PGI with the related information.

In another aspect, the subject concept is directed to a data migration system which includes:

a Burst Buffer (BB) tier operatively coupled between at least one data generating entity and the File System, and configured with a plurality of Burst Buffer Nodes (BBNs) and a plurality of Non-Volatile Memory (NVM) units, wherein each NVM unit is operatively associated with a respective BBN, and where at least a portion of the plurality of BBNs are arranged in at least one local storage pool.

The data generating entity is equipped with a parity group buffer and is configured to compose a Parity Group to be ingested in the BB tier. The Parity Group in question is constructed with a plurality of data blocks $BBB_1$, $BBB_2$, ..., $BBB_n$, each being filled with corresponding data fragments and containing metadata associated with the corresponding data fragments, and at least one parity block $BBB_p$ containing error correction coded data fragments contained in the data blocks $BBB_1$, $BBB_2$, ..., and $BBB_n$.

The data blocks $BBB_1$, $BBB_2$, ..., $BBB_2$, and the parity block $BBB_p$ in the same Parity Group share the local storage pool affinity.

The data generating entity is configured to send a "write" request for writing the Parity Group in question to the BB tier, and to assign a Burst Buffer Node $BBN_1$ from the plurality of BBNs to handle the first data block $BBB_1$ "write" in the BB tier.

The $BBN_1$ is configured to, upon receipt of the "write" request, generate a Parity Group Identifier (PGID) for the subject Parity Group, and an initial Parity Group Information (PGI) descriptor reflecting the data block $BBB_1$ information and its residency, to write the data block $BBB_1$, and the metadata associated therewith to a NVM associated with the $BBN_1$, and to send the PGID to the data generating entity.

The data generating entity is further configured to:

upon receipt of the PGID from the $BBN_1$, send the remaining members of the Parity Group in question, i.e., the blocks $BBB_2$, ..., $BBB_n$, and $BBB_p$ to respective BBNs sharing the local storage pool for storage therein.

Each BBN responsible for handling a corresponding data block or parity block is further configured to create an authoritative PGI, i.e., to update the initial PGI to reflect the storage of each subsequent block $BBB_2$, ..., $BBB_n$, and $BBB_p$, in a respective NVM unit associated with one of the $BBN_2$, ..., $BBN_n$, and $BBN_p$, respectively, and to replicate the authoritative PGI created by the BBN responsible for the block to other BBNs in the same local pool.

Upon completion of the Parity Group ingestion to the BB tier, the complete PGI is stored in the NVMs of the BBNs.

The subject system is further configured to, upon identification of at least one failed BBN in the local storage pool, track, using the PGI, a block of the Parity Group in question written in the failed BBN, and to re-send the block to another BBN in the local storage pool, which has not yet consumed any of the Parity Group's members.

The subject system further includes a Distributed Hash Table (DHT) server operatively coupled to the BB tier. The DHT server includes a plurality of DHT portions, with each DHT portion maintained by a respective one of plurality of BBNs. The DHT server is configured to store DHT objects in a corresponding DHT portion, wherein the DHT object may include the metadata and PGI associated with each of the $BBB_1$, $BBB_2$, ..., $BBB_n$, and $BBB_p$.

The system further includes a Jumbo Transaction group (JTG) structure created in the memory of the DHT server for holding a list of commands that mutate the DHT server's portions. The DHT objects are placed in the JTG structure associated with the corresponding BBN.

The subject system is further equipped with a Residency Reference Counts Structure coupled to the BB tier to indicate the number of active references to a DHT object. The Residency Reference Counts Structure is configured to increment count for data fragments added to a respective block in the Parity Group.

If the DHT object is the PGI, the Residency Reference Counts Structure is configured as a bitmap representing the blocks added to the PGI.

The subject system is further configured to replay the Parity Group into the File System. Each BBN is further configured to (during the Replay Phase of operation) acquire a metadata stored in the DHT server portion associated with each BBN, to read the data fragments from the corresponding data block, store the data fragment in a respective buffer in a structured format in accordance with the metadata, and to write the Parity Group in the File System, once the respective buffer is full.

When, during the Replay Phase of operation, the data fragments are replayed from a respective block to the File System, the Residency Reference Count Structure is configured to:

decrement count till the reference count for the respective block of the Parity Group in question reaches zero, to clear the residency reference bit associated with the Parity Group in the PGI's bitmap, and to delete the PGI from the BBNs when the Residency Reference Counts reach zero for all the blocks $BBB_1$, $BBB_2$, ... $BBB_n$, and $BBB_p$ of the Parity Group in question.

The system is also configured to (during the Replay Phase of operation) use the updated complete PGI to track the parity group's blocks needed for data reconstruction if data migration experiences faulty conditions.

These objects and advantages of the present invention will become apparent when considered in view of further detailed description accompanying the Patent Drawings.

BRIEF DESCRIPTION OF THE DRAWINGS

FIGS. 2A1-2A2 represent schematically the process of construction the Parity Group followed by the Ingestion of the Parity Group in the BB tier;

FIG. 2C is an abstraction representation of a Jumbo Transaction Group (JTG) used in the subject system;

DETAILED DESCRIPTION OF THE PREFERRED EMBODIMENT

The present system's operation is based on an Infinite Memory Engine (IME) concept which aims to integrate Non-Volatile Memory (NVM) into the parallel storage stratum. A Burst Buffer (BB) tier in the subject system serves as a mediator between HPC (High Performance Computers (clients) and existing parallel file systems for long-term data storage. The IME combines non-deterministic write methods with inferential data location techniques based on address domains. By using these techniques in a cooperative manner, a data storage system support is provided for extremely fast data ingestion into a set of I/O nodes within the BB tier while supporting a consistent "read" view of the entire underlying file system.

As a technology, the IME exploits a large array of NVM devices which are connected via a low-latency infrastructure for enabling fast ingest of data to NVM arrays by allowing the data to be stored in the NVM arrays in an unstructured manner, and allowing the system to provide an orderly, germane egress of the data from the distributed NVM arrays to a "permanent" (or long-term) storage, where it resides in a highly structured format.

Figure 1:
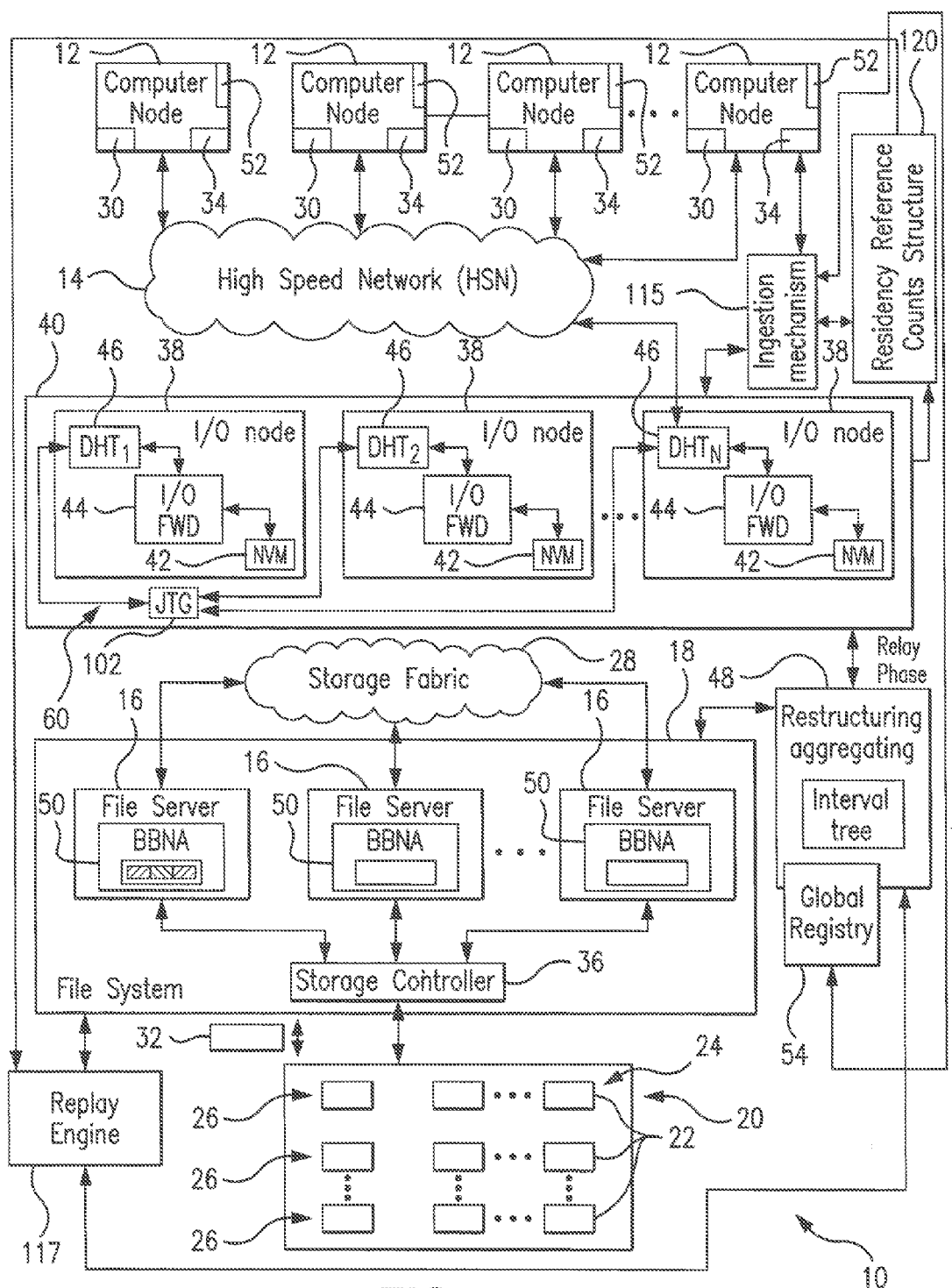
FIG. 1 is a block diagram of the subject data storage system.

Specifically, referring to FIG. 1, the data migration system 10 of the present invention includes a number of compute nodes 12. The compute nodes may be arranged in computing groups (or compute clusters) to perform complex computations of various types. The operation of the compute nodes depends on the system application. They may function as servers, supercomputing clusters, etc., and have the capacity to "write" by outputting data to, as well as "read" data from, an external memory, or any other storage device. In the present description, the above presented devices may also be intermittently referenced further as data generating entities, or computing architectures, as well as clients, or hosts.

The compute nodes 12 are operatively connected through a High Speed Network (HSN) 14 to File Servers 16 which may manage data migration from and to the compute nodes 12. The File Servers 16 may communicate through a Storage Fabric 28. The ratio of the compute nodes 12 to the File Servers 16 may in some cases be greater than 1,000. The High Speed Network (HSN) 14 functions as a high speed switch, and may be based on any of the network transport protocols, such as, for example, InfiniBand (IB), Fibre Channel (FC), Gigabit Ethernet (GigE), etc.

During the input/output (I/O) cycle of the compute node's operation, the data may be transferred from the compute node's cache to the File Servers 16 which may place data in the File System 18 for subsequent retrieval.

The subject system 10 is capable of handling any type of data transfer. However, as an example, the following description of the system operation will be centered on the Parity Group migration in the Ingestion phase of operation, including the creation and distribution of the Parity Group Information (PGI) serving as part of the addressing mechanism, as will be detailed further herein.

Data retrieved from compute nodes 12, and/or File Servers 16, are intended to be written into the File System 18, and stored in a primary storage sub-system 20 which typically includes data storage devices 22 in the form of Hard Disk Drives (HDDs), Solid-State Drives (SSDs), flash memory devices, magnetic tapes, or other storage media. For the sake of simplicity, and only as an example, the storage devices 22 will be referred to as disk drives, although any other storage media may operate as the primary storage sub-system 20.

The data storage devices 22 may be arranged according to any of a variety of techniques, and in any format, for example, as storage disk arrays 24. For example, the storage disk arrays may be arranged in the RAID (Redundant Array of Independent Drives) format. The RAID storage system is a multi-dimensional array 24 of disk drives (or flash memory devices) 22 distributed in READ/WRITE tier groups 26 for storing data D and parity values P corresponding to data stored in the array 24. Each tier group 26 in the array of data storage devices 22 constitutes a multiplicity of data storage channels.

A storage controller 36 controls the operation of the data storage devices 22 in their arrays 24. In the present system, the data storage devices 22 are preferably accessed in an optimally sequential (orderly) manner for disk drive exploitation, or in another efficient manner providing the uncompromised I/O performance of a storage controller 36 of the storage disk array 24.

Data storage devices 22 are provided with the capability of receiving data in the most efficient manner so that the system 10 avoids the need for an excessive number of data storage devices for storing the parity group data. Thus, the storage devices which do not participate in data transfer, may stay deactivated, as controlled by the storage controller 36 for the period they are not accessed. This avoids excessive power consumptions of the storage disk arrays.

Each compute node 12 is equipped with a software unit 30 which controls the operation of the compute node for the intended purposes and, as an example, is configured for construction of a Parity Group 32, as presented in FIGS. 2A1-2A2, further referred to herein combinedly as FIG. 2A, and detailed in following paragraphs.

In addition, each compute node (or client) 12 is equipped with a write-back cache 34 configured for construction and migration of the Parity Group 32 as will be detailed infra.

Connected between the High Speed Network 14 and the File Servers 16 are I/O nodes 38 (also referred to herein as I/O servers) which serve as an interface and render communication between the compute nodes 12, High Speed Network 14, and the File Servers 16 using a number of data transfer protocols (for example IB, FC, GigE, etc.), as needed by the system. The I/O nodes 38 are adapted for interfacing with the File Servers 16, as well as with the File System 18 in its entirety.

The capability of storing the data in an expedited and efficient manner is provided by utilizing a tier of storage hardware, also referred to herein as a Burst Buffer (BB) tier 40. The BB tier 40 is based on Non-Volatile Memory (NVM) technology which is operatively coupled between the compute nodes 12 and the File System 18. The BB tier 40, also referred to herein as an intermediate storage sub-system, includes a number of NVM units 42. Each NVM unit 42 augments a respective I/O node 38 operatively coupled to an I/O Forwarding Software 44 in the I/O nodes 38.

The I/O nodes 38, also referred to herein as Burst Buffer Nodes (BBNs), each of which is a server which acts as a temporary and fast store for data. Generally speaking, each burst buffer node is a member of a set which operates in conjunction to provide high performance and reliability.

In addition, each I/O node 38 has a portion of a Distributed Hash Table (DHT) server 46 included therein. $DHT_1$, $DHT_2$, ..., $DHT_N$ are the portions of the DHT server maintained by the I/O nodes 38 of the BB tier 40.

A Distributed Hash Table (DHT) is a class of a decentralized distributed system that provides a lookup service similar to a hash table in which (key, value) pairs are stored in a DHT server, and any participating node can efficiently retrieve the value associated with a given key. Responsibility for maintaining the mapping from keys to values is distributed among the nodes, in such a way that any change in the set of participants causes a minimal amount of disruption. This allows the DHT to scale to extremely large numbers of nodes and to handle continual node arrivals, departures, and failures.

A foundation of the DHT represents an abstract keyspace. A keyspace partitioning scheme splits ownership of the keyspace among the participating nodes. An overlay network then connects the nodes, allowing them to find the owner of any given key in the keyspace. Consistent hashing provides that a removal or an addition of one node changes only the set of keys owned by the nodes with adjacent IDs, and leaves all other nodes unaffected.

The DHT 46 in the subject system is primarily used to maintain location information for stored data items, also referred to herein as Unstructured Layout Metadata (ULM) for data fragments of the parity groups written by the compute nodes 12 in the BB tier 40. The ULM refers to the layout information of a Parallel File System whose contents may be arbitrarily distributed among the storage elements.

The DHT 46 may also store Parity Group Information (PGI) as will be detailed in further paragraphs, data item (or file) attributes, file replay status, and other information about the stored data item.

The present system 10 provides the data movement from the BB tier 40 into the File System 18 in a highly efficient manner while servicing "WRITE" requests. Similarly, when servicing "READ" requests, data migrates from the file system 18 into the requesting compute node(s) 12 in an efficient manner due to the usage of the intermediate data storage sub-system 40 (or BB tier).

Applications 52 running on compute nodes 12 facilitate the mitigation of the Parity Group to the Burst Buffer tier 40 instead of writing the Parity Group directly into the File System 18. The input performance of the NVM unit 42 is at least one order of magnitude faster than the input activity of HDD-based Parallel File System. Thus, the increase in I/O speed permits the applications to complete their calculating activity in an expedited fashion.

Fast ingest is crucial for enabling an application's check pointing and restart which has been a signature problem in high-performance computing for several decades. However, dealing with unstructured data is an expensive operation. Over time, it is not economical to maintain data in this manner, due to the metadata overhead expense. Therefore, the system 10 must restructure the ingested data stored in the NVMs 42 in the BB tier 40 at some later time.

The Parity Group 32 resident in the Burst Buffer tier 40 is moved into the Parallel File System 18 at some point to make room for a next Parity Group to transfer to the Burst Buffer tier 40 from a compute node. This is carried out during the Replay Phase of operation for which the present system is provided with a restructuring aggregation mechanism 48 which allows for the migration of seemingly random or unrelated data fragments from any single storage element (i.e., NVM 42 in the BB tier 40) to the File System 18.

Preferably, the restructuring operation occurs as part of the data migration process as data is moved from the NVMs 42 to the HDDs 22. The storage elements participating in this process may be called the restructuring aggregators since they are responsible for the ingestion of highly entropic data streams and the output of large structured segments. As part of the restricting aggregation, a software based unit, referred to herein as Burst Buffer Network Aggregator 50 (or BBNA), is included in the system. The BBNA 50 may run either on File Servers 16 or alternatively on the Parallel File System I/O nodes. The BBNA unit 50, shown in FIG. 1, is configured to coalesce the data fragments that are germane to the Parallel File System 18.

NVMs 42 are well suited for handling unstructured data, because of their high efficient random access properties. Additionally, as low latency interconnects become more commonplace, the boundaries between storage, network, and compute will become more opaque. This will enable the efficient interconnection of hosts' (clients') storage devices. However, the use of distributed NVM arrays as a single logical store requires a global registry capability that can store and retrieve the locality information (metadata) for any given segment of unstructured data. The present system provides means for the global registration of the locality information in a fully parallel and fault tolerant manner.

A global registry mechanism 54 is included in the subject system with the purpose of using highly interconnected NVM devices 42 as part of the restructuring aggregating mechanism 48. Using the global registry mechanism 54, the NVM storage tier 40 may be used in the present system 10 as a high performance buffer between two parties which are largely at odds with one another, i.e., applications 52 which do not have to be aware of the I/O alignment properties of the storage stack 40 and the HDD-based Parallel File Systems 18 that require highly structured data streams to achieve reasonable performance.

The present system, in one of the operational modes, addresses the creation of Parity Group Information (PGI) descriptors. PGI may be considered as the metadata associated with a Parity Group. PGIs include the set of extents from each burst buffer block of the Parity Group and each BBN in the BB tier. Once built by a client, a PGI is immutable and therefore may be easily replicated to multiply BBNs for resiliency. PGIs may be used to track members of a parity group and maintain state regarding garbage collection.

Specifically, the present system creates and distributes the PGIs in the Infinite Memory Engine (IME) to ensure coherency and fault tolerance for the data and the metadata in the non-deterministic data addressing system (which is the part of the Global Registry mechanism) 54. PGIs act as collection points for state describing the residency and replay status of Parity Groups, and will be detailed in following paragraphs.

Performing I/O in the IME based subject system 10 is a multi-step process starting with the client's aggregation of dirty buffers, followed by the receipt and ingestion of those buffers by the I/O servers 38 in the BB tier 40, and ending with replay of those buffers onto the Backing File System 18. In this context, the Backing File System is the storage system for which burst buffer capabilities are provided. Commonly this is a Parallel File System such as Lustre, PanFS, or GPFS. Along the way, the IME ensures fault tolerance for data and metadata in addition to redundancy for data processing.

The processes of handling "writes" in the IME based system 10 may be divided into the following phases: the phase of I/O ingestion which is carried out through the Ingestion mechanism 115 (shown in FIGS. 1, 2A-2B, and 4), the phase of replay into the Backing File System (BFS) which is carried out through the Replay Engine 117 (shown in FIGS. 1 and 2B), and the phase of a post-replay of garbage collection. These three phases are operationally interconnected, but each has a set of transactional instructions which are unique to each phase.

The present description will focus on the I/O ingestion phase for handling Parity Group ingestion into the NVMs 42, construction, and distribution of the PGI descriptors accompanying the Parity Group handling as part of the addressing mechanism. The restructuring aggregation of the Parity Group data migrating from the NVMs 42 to the primary storage 20 will be described to the extent involving the Parity Group and PGI creation, distribution, and processing for data reconstruction when needed for fault tolerance.

Referring to FIG. 2A, in the I/O ingestion phase addressed by the Ingestion mechanism 115, an Application 52 initiates data storage within the IME system 10 which may be carried out by using, for example, the client library available on the compute nodes 12. The client (or the compute node) 12 is outfitted with the write-back cache 34, best shown in FIGS. 1 and 2A. Cache entities are maintained in an interval tree which is designed to aid in the aggregation management process for the output held in the write-back cache 34 of the compute node 12, specifically for the output of the Parity Group 32 constructed by the Application 52. The Parity Group in this context is referred to as a set of burst buffers blocks (BBBs), also referred to herein as Parity Group buffers, originating from a single client which form a redundant data set. A parity group's size and redundancy level may be determined solely by the client 12.

The client's write-back cache 34 is tailored to place data blocks of the Parity Group (described further in detail in conjunction with FIG. 2A) onto the I/O servers 38 (also referred to herein intermittently as I/O nodes, or Burst Buffer Nodes BBNs) in the BB tier 40. Each I/O node 38 is responsible for a corresponding block's contents (extents) via the DHT 46 (best shown in FIG. 1), which is a lookup mechanism which is load-balanced across a set of nodes using deterministic functions to generate lookup handles.

The multi-step process of handling writes in the system begins with the clients' aggregation of "dirty buffers". The "dirty buffers" in this context refer to blocks in the data base buffer cache that have been changed (processed) but are not yet written to the primary storage sub-system.

The storage system 10 potentially includes thousands of I/O servers 38. The I/O servers 38 in the present invention are grouped into smaller failure domains which are called pools. In this manner, the system can easily survive multiple failures if the failures occur in different pods. All extents which are stored in the same pool, possess the "extent affinity". The extents that make up a PGI will all be affiliated with a single pool. The "pool-wise affinity" refers to the extents (data fragments) which "land" in the same pool 60.

As shown in FIG. 2A, when in the process of flushing dirty write-back contents to the I/O servers 38, the compute node 12 attempts to compose a Parity Group 32 from a set of extents which share pool-wise affinity. As will be presented further, the extents (data fragments) that constitute a PGI will be affiliated with a single pool 60, also referred to herein as a BBN Pool which is a group of Burst Buffer Nodes (BBNs) which form a fault tolerance group. The Parity Group 32 is entirely housed within a single pool 60.

Within the Parity Group 32, the client 12 attempts to build each block of data 62, 64, 66, . . . , 68, also referred to herein as $BBB_0$, $BBB_1$, $BBB_2$, . . . , $BBB_n$, to maximize server-level affinity to the best degree possible.

Each $BBB_0$, . . . , $BBB_n$ is referred to herein as a memory block, or a buffer, which is a unit (or a member) of the parity group 32. Burst buffer blocks may contain one or more extents (data fragments) 96 from any region of the same file. Burst buffer blocks are fixed size and may be ingested by any I/O node 38 which does not hold a member of the Parity Group 32.

As it is seen in FIG. 2A, each data block 62, 64, 66, . . . , 68 is composed of data fragments 96 which may be related or unrelated each to the other.

When the compute node 12 completes the operation of assembling the group of blocks, an operation of the erasure coding is applied to the data blocks 62-68, and a parity block 70 (also referred to herein as $BBB_{po}$) is thus resulted from the erasure coding. The parity (or RAID) block 70 in conjunction with the data blocks 62, 64, 66, . . . , 68, forms the Parity Group 32.

An erasure code is a forward error correction (FEC) code for the binary erasure channel, which transforms a message of k symbols into a longer message (code word) with n symbols such that the original message can be recovered from a subset of the n symbols.

The present system may use optimal erasure codes for the erasure coding routine which have the property that any k out of the n code word symbols are sufficient to recover the original message (i.e., they have optimal reception efficiency). Optimal erasure codes include maximum distance separable codes (MDS codes). Parity check is the special case where n=k+1. Parity eraser codes are usually used in RAID storage systems.

The subject system also may use near-optimal erasure codes which trade correction capabilities for computational complexity; i.e., practical algorithms can encode and decode with linear time complexity. Such may include Tornado codes, as well as low-density parity check codes, Fountain codes, Reed-Solomon coding, Erasure Resilient Systematic Coding, Regenerating Coding, etc., which may be used in the subject process.

Once assembled, the parity group 32 is delivered to the appropriate pool 60 of NVM units 42 in the intermediate data storage sub-system (or BB tier) 40.

In the BB tier 40, each member of the parity group 32, i.e. the data blocks 62, 64, 66, . . . , 68, and the parity block 70, is consumed by a respective I/O server 38 within the BB tier 40.

When the client has generated enough fragments 96 to form data blocks 62-68 to be written to corresponding I/O nodes 72-78, the client groups the blocks 62-68 into a stripe, and calculates the parity block 70 to form the Parity Group 32 which may be presented as a stripe of data to be distributed across the I/O servers in the local pool 60. Thus, the Parity Group 32 is envisioned as a stripe of Ad Hoc data to be written across multiple I/O nodes 38 with parity protection.

As shown in FIGS. 1 and 2A, when the data generating entity (or client) 12 generates a "WRITE" request, the parity group's blocks $BBB_0$, $BBB_1$, $BBB_2$, . . . , $BBB_n$, and the parity block $BBB_{po}$ are distributed among the I/O nodes 38 of the BB tier 40 participating in the process in a non-deterministic way, and thus tracking of the BBBs supported through their effective addressing is an important feature of the subject system.

The system 10 is a distributed system where each respective I/O node 72, 74, 76, . . . 78, and 80 stores one of the blocks 62, 64, 66, . . . , 68, and 70, respectively. When the client writes the Parity Group 32 in the BB tier 40, the client selects I/O nodes based on a hashing scheme for each data fragment 96.

The Global Registry/Addressing mechanism 54 for the Parity Group 32 tracking is enhanced via construction and distribution of a Parity Group Identifier (PGID) and Parity Group Information (PGI) structure. Parity Group Identifiers (PGIDs) are configured to provide globally unique handles for every Parity Group in the system. In principle, all I/O nodes 38 may generate PGIDs on behalf of any client. Further, the prescribed residency of the PGI structure is encoded into the PGID such by knowing the PGID, the location of the PGI may be inferred.

FIG. 2A details the data Ingestion mechanism 115 controlling the data ingestion from a single client (compute node) 12 to multiple I/O servers 38 within the IME system 10. Assuming the data blocks 62, 64, 66, . . . , 68, and the RAID block 70 constituting the parity group 32, are to be distributed to the I/O nodes 72, 74, 76, . . . , 78, and 80, respectively, along with associated metadata 82, 84, 86, . . . , 88, and 90 corresponding to the data blocks 62, 64, 66, . . . , 68, and the parity block 70, respectively, which are also written in the BB nodes 72-80. The metadata copies written into the I/O servers 72-80 are identified as 82', 84', 86', . . . , 88', and 90'.

The metadata 82-90 are formed by the client 12 for the data fragments 96, and are assembled in the write back cache 34.

Due to the distributed nature of Parity Group members ingested into the BB tier 40, the addressing of the data "writes" into the BB tier 40 is an important part of the subject system which is enhanced by creation and dissemination of the PGID and the PGI structures. The Parity Group Information (PGI) is a structure that holds all the information about each of the blocks 62-68 and the parity block 70 of the Parity Group 32 including their residency, the I/O nodes they are written in, the location of the parity data, and the RAID protection being used (N+P). The PGI is thus represented as a distributed fully scalable network-level RAID on Ad Hoc data. The construction and distribution of the PGI will be detailed in the following description.

The I/O ingestion mechanism 115 in question requires the client 12 to first obtain a PGID 92 from the I/O server chosen to handle the first "write" request, for example, the I/O server 72. The I/O node 72 handling a first block "write", assigns a PGID 92 to the PGI 94 for the Parity Group 32 built by the client 12.

For example, upon receipt of the "WRITE" request from the client 12, the I/O server 72 assigns a unique PGID 92 to the Parity Groups' I/O and commits the data block 62, along with the metadata 82, to the NVM unit 106 associated with the I/O node 72. The PGID 92 is committed in the metadata section 82 of the I/O server 72 along with the bulk data of the block 62. This insures that on reboot, the last allocated PGID can be found through a simple File System Check (FSCK).

The PGID is also provided to the client 12 for writing in the metadata sections 84, 86, 88, and 90 of the data blocks 64, 66, . . . , 68 and the RAID block 70, respectively, so that all members of the Parity Group 32 are identified with the same PGID 92. The I/O nodes assign PGIDs sequentially to the step of updating the PGI, i.e., subsequently to the addition of the next member to the PGI.

The DHT 46 contains a DHT object 100 which is the object in the I/O node that holds the state of the system including the data fragment 96 and the PGI Data 92.

For every Parity Group's member (block) sent from the compute node 12 to a given I/O server, this server places resulting DHT objects 100 within a Jumbo Transaction Group (JTG) 102 of the I/O sever and proceeds to issue and commit that JTG. Once the I/O server in question has committed the JTG, the client 12 learns of this action, and marks that member (block) of the Parity Group as complete. Once the client 12 has received the notice from each server involved in the storing of the Parity Group 32, the client may free buffers 34 composing that Parity Group.

Specifically, each I/O node 38 stores the fragment data 96 with the metadata copies 82', 84', 86', . . . , 88', and 90' in the NVMs 42. The DHT object 100 holds a copy of the metadata 82', 84', 86', . . . , 88', and 90' in the main memory 104 with a pointer to the BBB in the NV RAM.

JTGs are created in the memory on the DHT server 46 and are distributed among the DHT server's peers, i.e., DHT, $DHT_1$, $DHT_2$, . . . , $DHT_N$, during the first phase of a transaction commit. JTGs include a list of commands that mutate the DHT (i.e., related to objects insertion into the DHT, objects deletion from the DHT), and (if necessary) the list of objects 100 that will reside in the DHT.

Specifically, shown in FIG. 2C, is an abstract representation of the JTG 102, which is constructed with a plurality of batched operations designated for the plurality of the I/O node peers (I/O nodes 72, 74, . . . , 80) sharing the local pool (60) affinity.

The JTG 102 includes columns 200 dedicated to each of the plurality of I/O nodes involved in the JTG 102. The rows 202 of the JTG 102 are illustrative in FIG. 2C of the two-stage commit protocol for transactions between the I/O nodes 72, 74, . . . , 80.

The first stage of the commit protocol addresses a "filled" request (meaning that a group of requests has been filled to capacity and is ready for the JTG to begin the delivery process), a "delivered" request (meaning that the request has been sent to an appropriate I/O node), and a "delivery acknowledgement" request (meaning that the request has been acknowledged by the intended I/O node).

The second shape of the commit protocol addresses the "commit" command and "commit acknowledge" request. The "commit" is a command to fulfill the request, such as, for example, to "write" it to the I/O node(s). The "commit acknowledge" is a response that the request has been completed.

This process ensures that these batched transactions are completed by each I/O node that is relevant to the request. By requiring "commits" and "commit acknowledgements", failures of I/O nodes during the process can be quickly alleviated, and non-responsive I/O nodes can be quickly identified.

JTGs may be used to batch a series of DHT objects requests, so that a given I/O node may make requests to all its peers in the same local pool 60. In this manner, the volume of traffic across the I/O nodes can be minimized.

After committing the bulk data 62 in the I/O server 72 (the first I/O node to ingest the member of the Parity Group 32), the I/O server 72 proceeds to enqueue a number of transaction-based operations into the current JTG 102.

Once a client has obtained the PGID 92 from the first I/O server 72 which ingested the data burst buffer block 62 ($BBB_0$), it may proceed to send the remaining Parity Group's is members (data blocks $BBB_1$, $BBB_2$, . . . , $BBB_n$, as well as the parity block $BBB_{po}$) to other I/O servers 64, 66, . . . , 68, and 70 forming the pool 60. This bulk sends may occur sequentially or in parallel. Upon receiving the remaining parity group members (blocks 64, 66, 68, and 70), the I/O nodes enqueue the parity block reference count updates to the pool-local PGI maintainers, i.e., add the updates to their queue.

Figure 3:
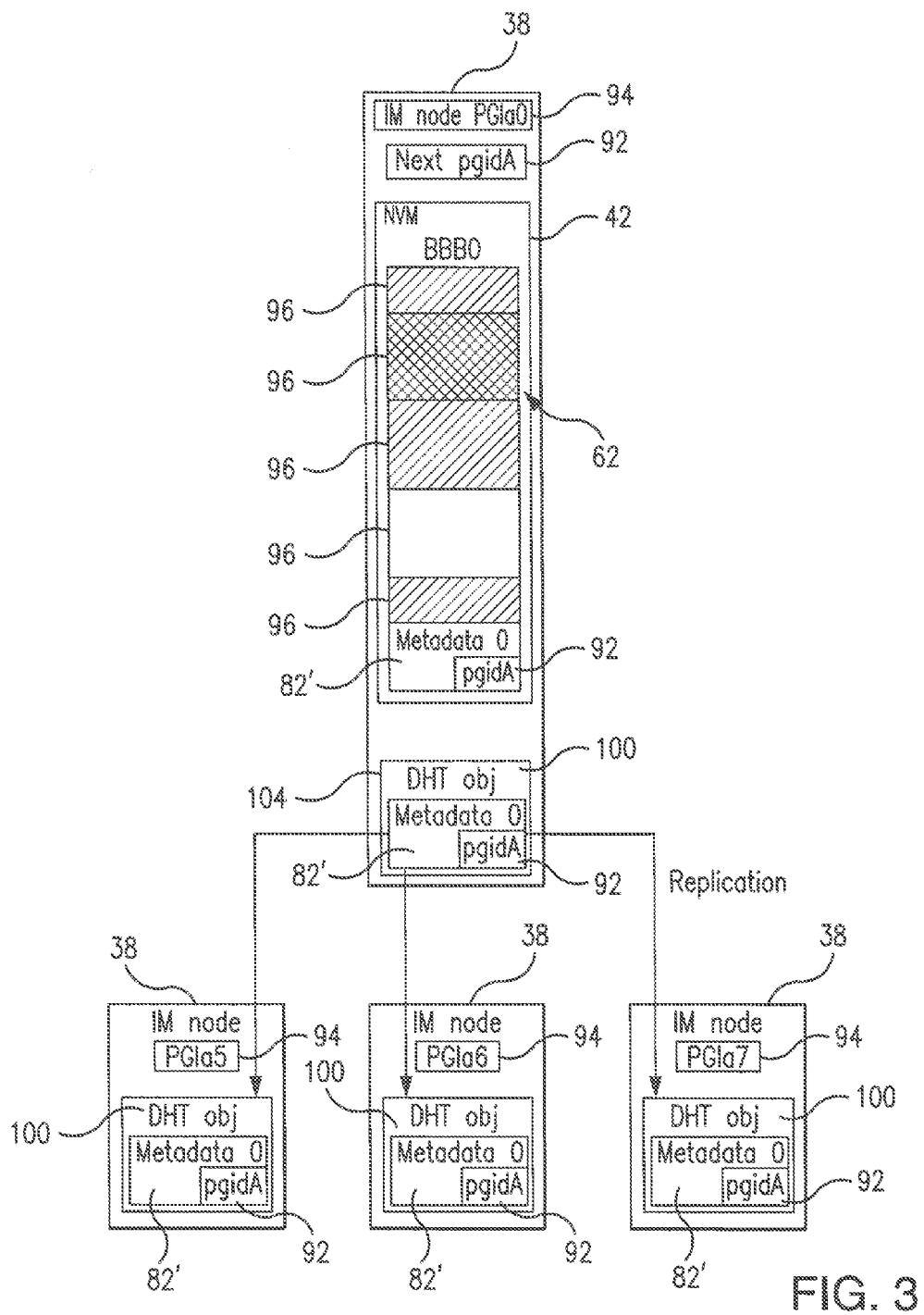
FIG. 3 is a diagram showing schematically the replication routine of the DHT object to other I/O nodes sharing the local pool affinity in the subject system.

Each PGI is fully independent. The PGI information may be replicated across multiple I/O nodes for redundancy, as shown in FIG. 3 which is a diagram representing the replication process of the DHT object 100 containing the PGI 94 metadata 82' to other I/O nodes in the present system. In this process, the I/O node which holds a part of the parity group, has a copy of the PGI 94, or knows which I/O node has an authoritative copy of the PGI.

Figure 2B:
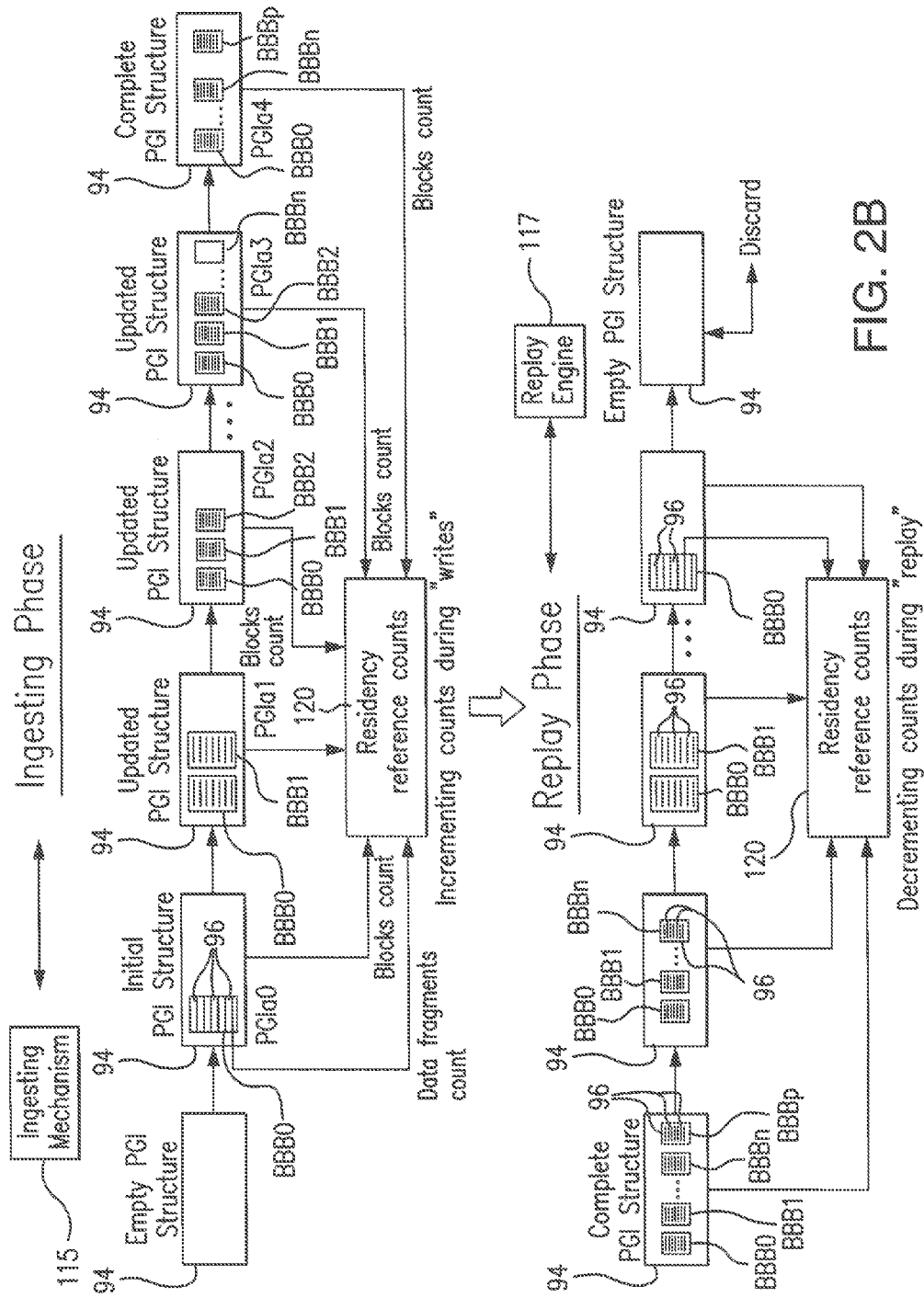
FIG. 2B is a schematic representation of the routine of updating of the PGI during the Ingestion Phase of operation and during the Replay Phase of operation, and a corresponding residency reference counting routine.

In the I/O initiation process, the client requests that an I/O node creates a new (updated) PGI when the client sends a new data block that is not part of an existing PGI. Referring to FIGS. 2A and 2B, representing the dynamics of the PGI creation and distribution supported by the Ingestion mechanism 115, an initial PGI 94 (for example, shown as PGIao) is created by the first I/O node 72 to reflect the ingestion of the first "write" data block 62. The client adds further additional "write" data blocks of the subject Parity Group 32, such as block 64, 66, . . . , 68, to the originally created PGI 94 by sending the remaining members of the Parity Group, i.e., $BBB_2$, . . . , $BBB_n$ (blocks 64, 66, . . . , 68) to other nodes, such as 74, 76, . . . 78, all of which share their unique PGID.

The PGI_update message is sent to an authoritative I/O node, i.e. the node handling a respective member of the Parity Group 32 which is entitled to create an authoritative PGI reflecting the writing of this respective member. The PGI_update command is sent out each time the data block 64, 66, . . . , 68 is written.

For example, for the data block $BBB_1$, the I/O node 74 is the authoritative node. Similarly, for the data block $BBB_n$, the I/O node 78 is the authoritative node. Once the updated PGI is generated by the authoritative I/O node, the copy of the updated PGI is sent to all I/O nodes sharing the local pool affinity. Responsive to the storing of the block in the BB tier, the authoritative node updates the previous PGI to create updated PGIs (PGIa1, PGIa2, PGIa3, etc.) and sends the updated PGIs to other I/O nodes in the same local pool.

In FIGS. 2A-2B, the updated PGI after ingesting the data block 64 ($BBB_1$) in the I/O node 74 is shown as PGIa1. The updated PGI after ingesting the data block 66 ($BBB_2$) in the I/O node 76 is shown as PGIo2. Similarly, the updated PGI after ingesting the RAID block 70 in the I/O node 90 is shown as PGIo4.

The PGI is initialized with a number of composing blocks when it is created. This prevents the PGI from being reaped before it has been fully rectified by the entire complement of JTG updates from the I/O servers. The client completes the parity group put once each I/O server has replied success. Should one more server fail, the client is free to resend the parity group components to any I/O server in the pool which has yet to ingest a parity group member.

The parity (RAID) data are added to the PGI when the client allocates new data blocks for the RAID protection, calculates and saves the RAID protection data into the RAID segment buffers, and sends the RAID block 70 to I/O node(s) 80 that has not yet consumed a data block from the current PGI.

Upon completion of the process of writing each component of the parity group into the BB tier 40, the client sends an update message to the authoritative I/O node for the PGI update for each RAID block added. The authoritative I/O node is the node responsible for a given range of the file system address mapping for read. The number of authorities for a given range is dependent on the value of the burst buffer configuration. When the PGI is full and all the I/O nodes have responded that the data block 62-68 and the RAID (parity) block 70 have been saved to the NVMs in the BB tier 40, the PGI is closed and saved.

The "first to write" I/O node 62 creates the unique PGID 92 for the initial PGI 94, sends it to the client 12 for storage in the respective metadata section of the write blocks 64 . . . 68, as well as of the parity block 70, and subsequently writes each block to the corresponding NVM unit 42.

The PGI on the I/O node 62 which has created the PGI, becomes an authoritative PGI. The client then sends updates to the I/O node 62 to update the authoritative PGI when additional data or parity blocks are added to it. Subsequently, the updated PGI is sent to other I/O nodes in the pool 60. The client 12 who has requested the creation of the PGI will be the only one to add the write blocks of the parity group 32 to the PGI in question.

The PGI structure contains the information which is used to locate each data block and parity block of the parity group 32. Each data block and parity block 62, . . . , 70 has a unique ID in the system. The PGI holds the blocks' ID and the ID of the I/O node where the data block or parity block is located. However the PGI does not have a sufficient information on the data fragments 96 in each data and parity block, or which file the data fragments 96 belong to. That information is stored in the metadata region 82, 84, 86, 88 and 90 of each data and parity blocks 62-70, respectively.

The I/O node 62 that creates the initial PGI structure 94 stores the authoritative copy of the PGI in its main memory 104. Contents of the authoritative PGI are replicated to other I/O nodes as shown in FIG. 3. When the PGI is full and closed, it is saved into the NVM unit of the authoritative I/O node that created it.

As shown in FIG. 2A, for any given data or parity block 62, ..., 70 of the parity group 32, there is a single corresponding I/O node 72, ..., 80 which is responsible for this block. The authoritative I/O node for the PGI is the one that has created the PGI and assigned it a unique PGID. In FIG. 2A, the node 72 is considered an authoritative I/O node for the PGIa0. All other copies of the PGI on other I/O nodes are non-authoritative. If the authoritative I/O node fails, then one of the non-authoritative copies of the PGI will become the authoritative PGI.

The non-authoritative PGIs will be identical to the authoritative PGI. However, any changes that are performed on the PGI are done on the authoritative PGI first and replicated to the non-authoritative PGIs.

Figure 4A:
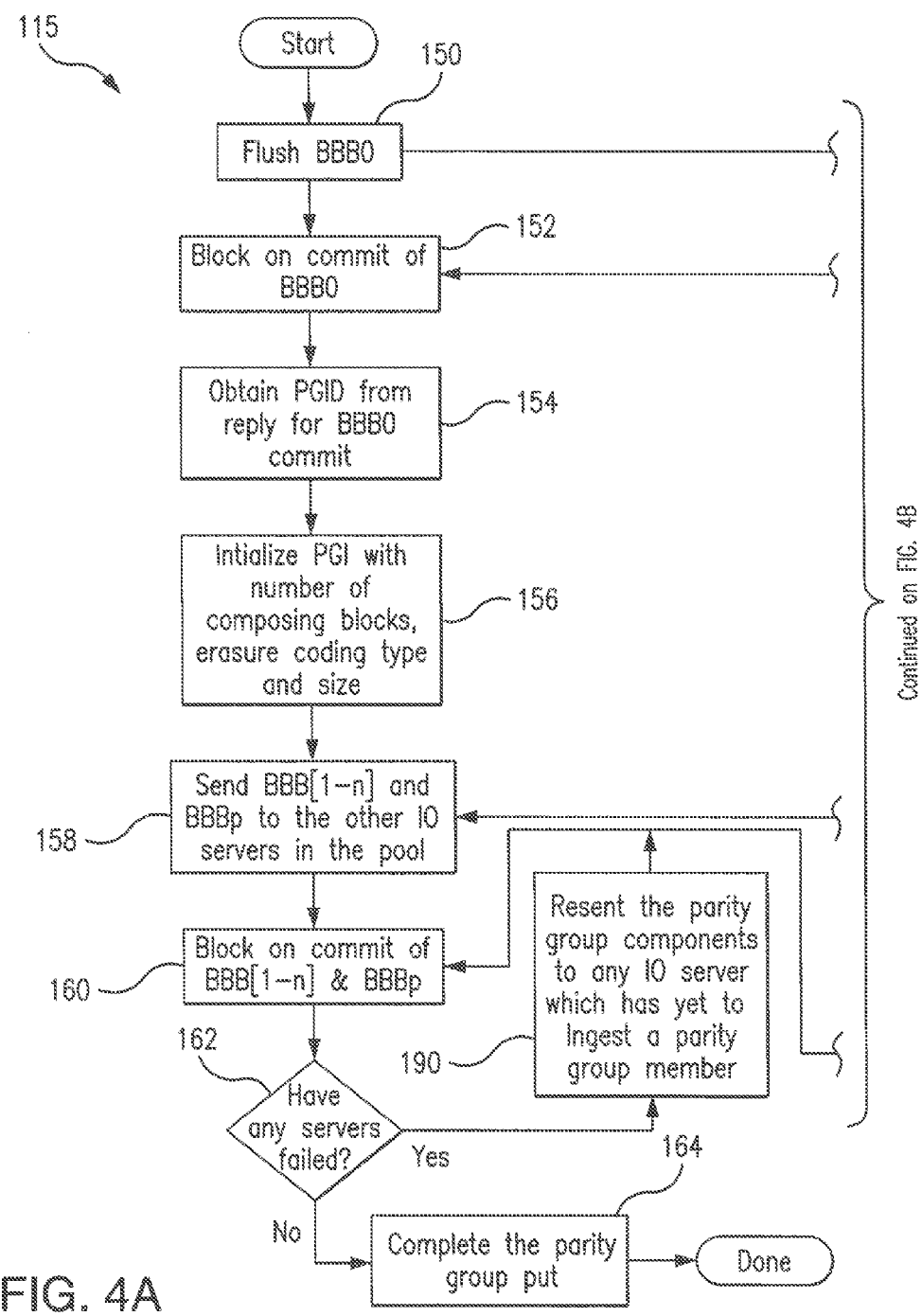
FIGS. 4A-4B represent a flow chart diagram reflecting the client-I/O nodes interaction process underlying the I/O ingestion phase of operation for handling the "write" requests and involving creation and update of PGIs in the present data storage system.
Figure 4B:
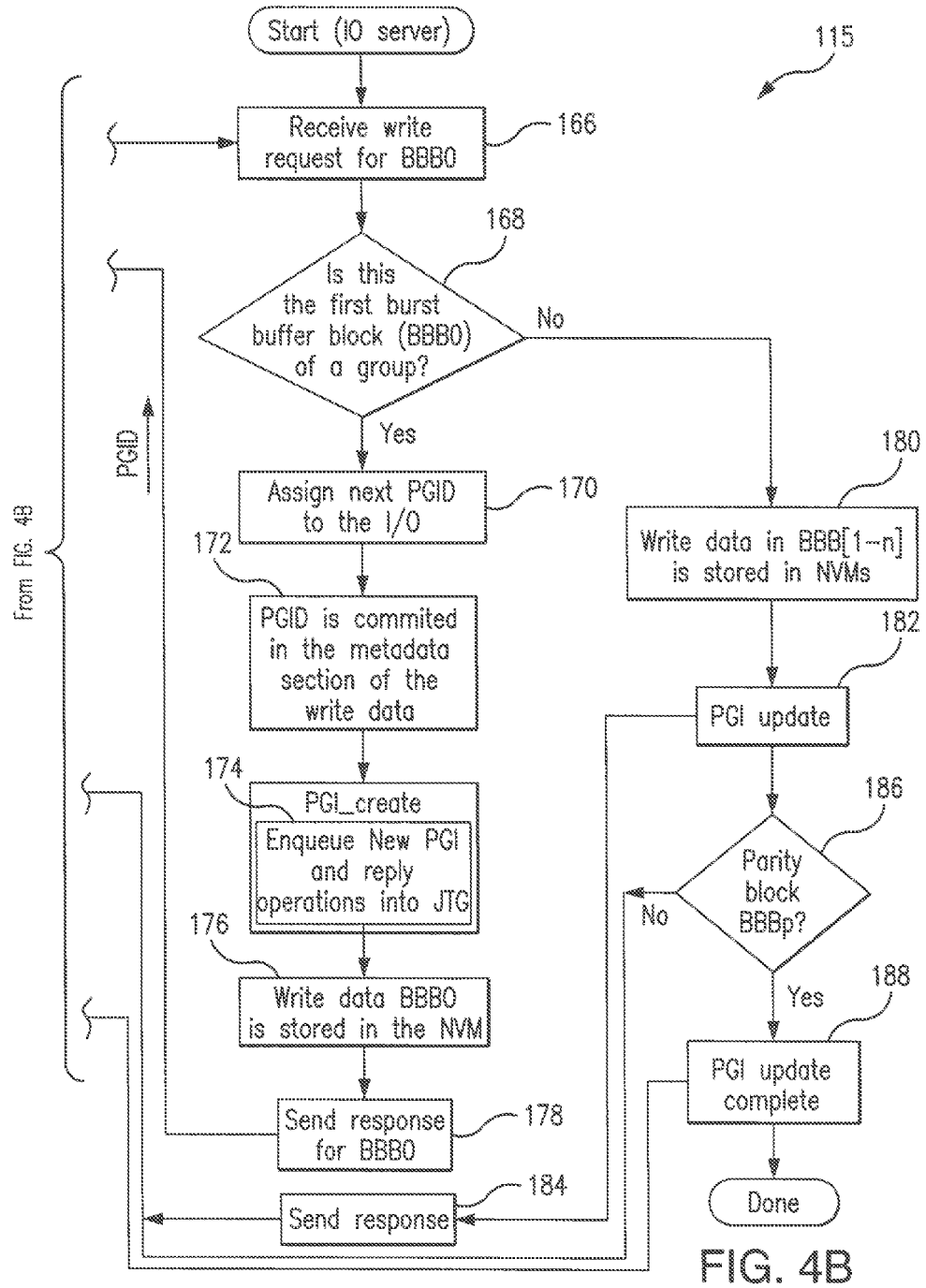

Referring to FIGS. 4A-4B, further referred to herein combinedly as FIG. 4, representing the flow chart diagram of the IME client and the IME server(s) interaction during the Ingestion Phase 115 for the creation and distribution of the PGI in the process of writing the parity group to the BB tier, upon the construction of the parity group, the client attempts to store the parity group in the intermediate storage sub-system, by first requesting in step 150 the $BBB_0$ flush to an I/O node (server).

Upon receiving, at step 166, the "write" request for $BBB_0$ block, the procedure moves to logical block 168, where the I/O node decides if the $BBB_0$ "write" request is the first burst buffer block of a parity group in question. If the $BBB_0$ is the first burst buffer block of the parity group, the I/O node assigns the PGID to the Parity Group in question in block 170 and PGID is committed in the metadata section of the write data in block 172.

Subsequently to the step 172, the logic passes to block 174 to execute PGI_create routine at the I/O node side of the process.

The following transactional PGI related instructions are employed in the I/O ingestion phase: Parity Group Information create (PGI_create) and Parity Group Information update (PGI_update).

PGI_CREATE

PGIs act as collection points for the state describing the residency and replay status of parity groups. PGI_create instructions are issued by an I/O server when that I/O server detects a new parity group being stored by client. The I/O server recognizes this fact in step 168 by simply noticing that a client has attempted to store the first burst buffer block $BBB_0$ of a parity group. At this moment the I/O server enqueues the PGI_create instruction to the servers in the pool which maintain the authoritative PGI (PGIa) shown in FIG. 2A.

It may be the case that the server handling $BBB_0$ is a member of the set PGIa[0-M]. Any member of the pool which holds a data or metadata segment for a given PGID will have a PGI structure for this purpose. However, only the properly designated nodes may manage the authoritative PGIs for the pool.

The PGI_create command is executed by the nodes PGIa [0-M] before the commit of JTG has occurred.

This is done to avoid erase conditions where I/O servers attempt to operate on the PGI before it has been initialized. Since an empty PGI is only a handle, creating it in this manner does not cause metadata consistency issues if the JTG fails to be committed.

PGIs are initialized with the parity group identifier (PGID) and the properties of the parity group, such as erasure coding type and size. At initialization time the PGI has no information regarding the residency or fragment count of its blocks.

In the subsequent step 174, a new PGI (i.e., the $PGIa_0$ shown in FIGS. 2A-2B) is created by the I/O node handling the first "write" $BBB_0$. Subsequently, the first PGI is enqueued into the main memory 104 of the I/O node 72, particularly into JTG 102 corresponding to the I/O server handling the $BBB_0$ write.

Upon completion of the PGI_create instruction, in subsequent step 176, the data block $BBB_0$ is stored in the NVM 42. The PGI on the I/O node which created it becomes the authoritative PGIa.

Subsequently, in step 178, the I/O node sends response containing PGID to the client.

At the client's side of the process, subsequent to step 150, in step 152 the client executes a block on commit of the $BBB_0$ so that the client after flushing the $BBB_0$ to the respective server waits for the server to perform the PGI_create and "write" the $BBB_0$ to the respective NVM in steps 170-176. At the client side, in the subsequent block 154, the client obtains the PGID assigned in block 170 by the I/O server from the reply for $BBB_0$ commit received from the I/O server and follows to step 156 to initialize the PGI with a number of composing blocks of the corresponding parity group, erasure coding type, and the size of the parity group and composing blocks.

The client does not receive a copy of the PGI that was created by the I/O server, but upon obtaining the PGID, the client has all the information necessary to recreate the PGI created by the I/O server. So, the client fills in its copy of the PGI with the PGID sent from the I/O server in step 178, and the information for the first block $BBB_0$ it added.

Subsequent to the step 156, the logic attempts, in step 158, to send the rest of the blocks of the parity group to the other I/O servers in the pool which have not ingested the blocks of the parity group in question yet. Prior to sending the rest of the data blocks and the parity block of the parity group in question, the logic, in step 160, puts block on commit of blocks $BBB_1$, $BBB_2$, ..., $BBB_n$, and $BBB_{po}$ in order to wait for the corresponding I/O servers to save the buffers (blocks) to their NVMs after the client sends the buffers to these servers.

At the I/O server's side, when the I/O servers (other than the I/O node handling the first block $BBB_0$ write), receive the "write" request for the remaining blocks in the parity group, i.e., for those which are not the first burst buffer block $BBB_0$ of the parity group, the process flows from the logic block 168 to the block 180 where the data in $BBB_1$, $BBB_2$, ..., $BBB_n$ is stored in the respective NVMs 108, and 110, ..., 112, respectively.

The $BBB_1$, ..., $BBB_n$ "writes" may be performed sequentially or in parallel. Each time an additional block $BBB_1$, ..., $BBB_n$ is written with the corresponding NVM, the authoritative I/O node performs the PGI-update routine in block 182 resulting in the initial PGI update to add the information corresponding to each added data block. Upon writing each remaining data block (other than the data block $BBB_0$), the I/O node sends, in step 184, a response to the client which waits in step 160 for the response from the I/O servers ingesting the data blocks $BBB_1$, ..., $BBB_n$.

The logic further follows to logical block 186 where the decision is made whether the parity (RAID) block 70 is ingested within in the corresponding NVM 114.

If it is identified in logic block 186 that the parity block has not been stored in the NVM 114 yet, the logic sends a request to the client to send the parity block to the I/O node.

PGI_UPDATE

If, however, the parity block is stored in the NVM 114, the logic performs the PGI_update routine in step 188, thus creating the PGI for the complete parity group, and thus the procedure for storing the parity group, PGI creation is completed.

The PGI_update instructions are delivered to the I/O nodes holding authoritative PGIa [0-M] after the ingest of a block by a server. Unlike the PGI_create instructions, the PGI_update instructions are executed only after the owing JTG has been committed by the initiating server. PGI_update instructions instruct the authoritative nodes PGIa [0-M] to attach the provided burst buffer block state to the corresponding PGI. The parameters provided by the instruction are the PGID (which does not change), the block number within the parity group, the number of discrete extents within the block (data fragment count), and the residency information. The residency information may take two forms including a server address or a block address if the block has been stored locally, i.e. in the local pool.

Once the PGI has been fully populated, the IME system 10 may perform rebuilds on behalf of failed nodes or NVM devices. Thus from block 160, the logic flows to the logical block 162 where a decision is made whether any I/O server has failed. If none of the servers failed, the logic flows to block 164 to complete the parity group put and the procedure is terminated.

If, however, in the logic block 162, a failure of at least one server has been found, the procedure follows to block 190 where the client can resend the parity group components to any I/O server which has yet to ingest a parity group member. Upon completion of step 190, the logic returns to block 160.

A Residency Reference Instruction is a transactional command which is employed in the I/O ingestion phase in the subject system. The residency reference command is used to denote data residency within the BB tier on behalf of a specific file object. These are generally composed of pool-local and global reference objects.

The residency references are accumulated as part of the data ingestion phase and are removed as data is replayed into the BFS. Once the last reference has been removed, the system may assume that no dirty data remains in the Burst Buffer storage.

The Residency Reference Counts Structure 120 (shown in FIGS. 1 and 2B) indicates the number of active references to an object, such as a PGI or a "write" block, in the system. A "write" block contains a number of fragments 96 of file data, so its residency reference counts may be represented by an integer that counts the fragments of file data.

As presented in FIG. 2B, in the Ingesting Phase 115, the reference count is incremented for each data fragment 96 added to the block. Similarly, the counts for blocks are incremented as new blocks $BBB_0, BBB_1, BBB_2, \ldots, BBB_n$ and $BBB_p$ are added to the PGI, i.e., the empty PGI is updated to the Initial $PGI_{a0}$ when the block $BBB_0$ is added. The ingestion process continues as the remaining blocks $BBB_1, BBB_2, \ldots, BBB_n,$ and $BBB_p$ are added till a complete PGIa4 is created for the completed Parity Group put. The Residency reference count is incremented as the blocks are added to the PGI.

For the PGI, the residency reference count is represented by a bitmap where the bits represent the write blocks that were added to the PGI during PGI_update routine.

Further, the fragment count may be used by the Replay Engine 117 (shown in FIGS. 1 and 2B) to track garbage collection readiness for the Parity Group in question. When the fragments in the "write" blocks are replayed to the Parallel File System, the reference count is decremented. When the reference count on the data block reaches zero, then all of the fragments 96 in the data block BBB have been replayed, and the residency reference bit in the PGI for the "write" block is cleared. When all of the residency reference counts are zero (for all blocks), then the entire PGI has been replayed, and the PGI can be discarded.

Along with the reference count updates, the extent descriptors themselves are placed into the JTG 102 for dissemination to the appropriate peers (I/O servers in the pool 60).

Global and Pool-Local reference counts count objects are used in the present systems.

Global objects are used in the subject system in cases where an exclusive entity must be maintained across the entire system. Such examples include tracking of open( ) and close( ) calls issued by a large parallel application. Similarly, on replay of files that span many or all I/O nodes, global reference objects are used by the system to track when replay activities have been completed. Another case could be inode (index node) attributes for a given object. Any place where a single authoritative entity is required a global object can be used to meet that need.

The foundation of the global distributed reference object is the pool-local reference object which itself is used by a variety of tasks. These include determining when a parity group may be garbage collected and acting as subcomponents for global reference counts. The complexity surrounding replicated reference count objects within the DHT is hidden by the two-phase commit distributed transaction engine, which consistently manages updates to replica objects.

Pool-local reference counts operate in the following manner. The DHT 46 application wishing to establish a reference count does so by first hashing the reference object's identifier in a manner which exposes the owning pool and I/O nodes.

For example, to establish a reference object for extents belonging to a given file, the application would present a tuple composed of the file identifier (FID), rank number, and a specific number which is assigned to the reference type, to the hash function. The hash function outputs the corresponding server, though any server in the pool is valid target for the request.

Upon receiving a reference request, the server uses this information along with the operation type (increment, decrement, create, destroy) to construct a DHT object on behalf of the reference. Subsequently, the server will submit the DHT reference object through its two-phase commit technique so that the relevant successors will become aware of its existence. Querying of the reference may be done by clients and servers alike through direct access by sending a DHT fetch request to one of the available successors. However, modifications of reference objects, as previously described, must be handled through the transactional mechanism to ensure consistency.

Global reference objects are composed of multiple pool-local reference objects which have been designed as components. This object type is meant to provide scalability in situations where a large number of clients are performing a coordinated global activity such as I/O on a large shared file. Theoretically, global reference objects allow for a scaling factor equivalent to the number of pools in the system.

The global reference object does not resemble a typical reference counter but rather, it appears as a bit field where a single bit is designated for each pool in the system. Creating global references is carried out by first creating a pool-local reference object which has been tagged with some state designating it as a member of a global reference. The local pool ($Pool_L$) encapsulates its pool-local reference request within a JTG. Upon execution of the JTG, the successors of the object will message the global pool ($Pool_G$) instructing it to establish the global reference. This request will block until the $Pool_G$ has committed the request via a transaction in its pool. Once the $Pool_L$ has created this object and instructed $Pool_G$ to do its part, $Pool_L$ may proceed with local operations on the reference object until the local object count reaches zero. At that time $Pool_G$ is contacted and instructed to remove $Pool_L$'s reference.

When the global object no longer contains any pool-local references an arbitrary routine may be executed on behalf of the object. For example, consider the IME replay engine. Replay represents a case where certain operations must block until the entire system has completed the data movement portion of the replay procedure. While a given pool has extents to replay, the global reference object reflects this state with a single bit for the pool. When the pool has completed its extent operations the global object is unreferenced. Subsequently, when the global object is fully unreferenced a single finalization operation, such as a namespace operation, may occur in a fully non-reentrant context.

When the Parity Group in the system needs to be replayed from the BB tier 40 to the Parallel File System, an I/O node begins taking all of the data fragments and metadata stored in the DHT and "flattens" them. The term "flattens" means in this context that any older fragment data that was overwritten by newer fragments is discarded so that only the latest (or final) fragment data is written to the PFS.

Subsequently, the I/O node begins reading the flattened data fragments out of the NVM and places them into buffers, thus performing a somewhat random read from the NVM.

Subsequently, when the buffers are full, the I/O node issues "write" requests to the PFS to commit the data. The information, about the blocks contents (data fragments in each block) is stored in the metadata section of each block in the NVM of the corresponding I/O node, as shown in FIG. 2A. The data fragments information is also stored in a more compact format in the main memory 104 of the I/O node.

The PGI does not have all information of the data fragments. The PGI's function is to track BBBs which are the members of the Parity Group. The PGI is used for redundancy purposes. If an I/O node, or memory unit (HDD, SSD, etc.) fails, or a device reports a "bad" block, then the PGI tracks all of the members of the Parity Group that are needed to reconstruct the missing data. Once all of the blocks in the PGI are replayed to the PFS, the PGI will be discarded.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migration between data generating entities and a File System in a data storage system, comprising:
    (a) operatively coupling a Burst Buffer (BB) tier between at least one data generating entity and the File System, and configuring said BB tier with a plurality of Burst Buffer Nodes (BBNs) and a plurality of Non-Volatile Memory (NVM) units, wherein each NVM unit is operatively associated with a respective BBN of said plurality thereof;
    (b) composing, by said at least one data generating entity, a Parity Group having a plurality of data blocks $BBB_1$, $BBB_2$, . . . , and $BBB_n$, and at least one parity block $BBB_p$;
    (c) sending, from said at least one data generating entity, a "write" request for writing said Parity Group to said BB tier;
    (d) assigning a Burst Buffer Node $BBN_1$ from said plurality of BBNs to handle a "write" request for said first data block $BBB_1$ of said Parity Group, and, upon receipt of said "write" request from said at least one data generating entity:
        generating, by said $BBN_1$, a Parity Group Identifier (PGID) for said Parity Group and an initial Parity Group Information (PGI) structure for said Parity Group, wherein said initial PGI contains information addressing said data block $BBB_1$,
        writing said data block $BBB_1$ and said metadata associated therewith to a NVM associated with said $BBN_1$,
        writing said PGID to metadata section in said $BBN_1$, and
        sending said PGID to said at least one data generating entity;
    (e) upon receipt of said PGID by said at least one data generating entity from said $BBN_1$, assigning said PGID to at least one subsequent of said data blocks $BBB_2$, . . . , $BBB_n$ and said at least one parity block $BBB_p$, and sending said at least one subsequent block to a respective at least one BBN of said Burst Buffer Nodes $BBN_2$, . . . , $BBN_n$, and $BBN_p$;
    (f) updating said initial PGI after each writing of said at least one subsequent block from said $BBB_2$, . . . , $BBB_n$, and BBBp in a respective NVM unit associated with said respective at least one of said Burst Buffer Nodes $BBN_2$, . . . , BBNn, and BBNp, respectively, to reflect the writing of said at least one subsequent block, until all remaining said data blocks $BBB_2$, . . . , $BBB_n$, and said at least one parity block $BBB_p$ have been written in said respective Burst Buffer Nodes $BBN_2$, . . . , $BBN_n$, and $BBN_p$, thus generating a complete PGI for said Parity Group; and
    (g) saving said complete PGI to said NVMs associated with said $BBN_1$, $BBN_2$, . . . $BBN_n$, $BBN_p$ upon completion of said Parity Group ingestion in said BB tier.

2. The method of claim 1, further comprising:
    in said step (b), forming, in Parity Group buffers of said at least one data generating entity, said plurality of data blocks $BBB_1$, $BBB_2$, . . . , and $BBB_n$,
    filling each of said plurality of data blocks with unstructured data fragments, establishing, in association with said each data block, a metadata section containing metadata addressing said unstructured data fragments filling said each data block, applying an error correction code to said data fragments in said blocks $BBB_1$, $BBB_2$, ..., $BBB_n$, and forming said at least one parity block $BBBp$ containing the error correction coded data fragments and metadata contained in said plurality of data blocks $BBB_1$, $BBB_2$, ..., and $BBB_n$, and constructing said Parity Group containing said plurality of data blocks $BBB_1$, $BBB_2$, ..., and $BBB_n$, and said at least one parity block $BBB_p$.

3. The method of claim 2, further comprising:

in said step (a), arranging at least a portion of said plurality of BBNs in at least one local storage pool, wherein said data blocks $BBB_1$, $BBB_2$, ..., and $BBB_n$, and said at least one parity block $BBB_p$ of said Parity Group share said at least one local storage pool affinity.

4. The method of claim 3, further comprising:

prior to said step (g), identifying if at least one BBN in said at least one local storage pool has failed;

resending a block assigned to be written in said failed at least one BBN to another BBN in said at least one local storage pool; and repeating steps (f) and (g).

5. The method of claim 4, wherein in said step (e), said respective at least one BBN is free of any of said Parity Group's blocks.

6. The method of claim 3, further comprising:

in said step (f), updating said initial PGI by said respective at least one of said Burst Buffer Nodes consuming said at least one subsequent block, thus creating an authoritative updated PGI, and after said step (f), replicating said authoritative updated PGI created by said respective at least one of said Burst Buffer Nodes to other Burst Buffer Nodes in said at least one local storage pool.

7. The method of claim 2, further comprising:

in said step (e), sending said blocks $BBB_2$, ..., $BBB_n$, and $BBB_p$ to their respective BBNs sequentially.

8. The method of claim 2, further comprising:

in said step (e), sending said blocks $BBB_2$, ..., $BBB_n$, and $BBB_p$ to their respective BBNs in parallel.

9. The method of claim 2, further comprising:

in said step (a), operatively coupling a Distributed Hash Table (DHT) server to said BB tier, wherein said DHT server includes a plurality of DHT portions, each DHT portion being maintained by a respective one of said plurality of BBNs, and writing at least one DHT object in a corresponding one of said DHT portions, wherein said each DHT object includes said PGI and metadata associated with a corresponding one of said Parity Group's blocks $BBB_0$, $BBB_1$, ..., $BBB_n$, and $BBB_p$.

10. The method of claim 9, further comprising:

in said step (a), creating a Jumbo Transaction Group (JTG) structure in a memory of said DHT server, and distributing said JTG structure among said DHT server's portions, wherein said JTG structure holds a list of commands that mutate said DHT server's portions, in said step (d), for every block in said Parity Group, placing said at least one DHT object in said JTG structure, associated with said respective at least one of said BBNs, subsequently, committing said JTG at said respective at least one of said BBNs, and subsequently, indicating, at said at least one data generating entity, said every block writing as complete.

11. The method of claim 2, further comprising:

in said step (g), upon completion of said Parity Group ingestion to said BB tier, cleaning, at said at least one data generating entity, said Parity Group buffers.

12. The method of claim 9, further comprising:

in said step (a), coupling a Residency Reference Counts Structure to said BB tier to indicate the number of active references to said at least one DHT object, and in said step (f), incrementing said Residency Reference Counts Structure for said corresponding Parity Group's block for each said data fragment added thereto.

13. The method of claim 12, further comprising:

for said at least one DHT object including said PGI, configuring said Residency Reference Counts Structure as a bitmap representing said Parity Group's blocks added to said PGI.

14. The method of claim 13, wherein said steps (b)-(g) constitute an Ingestion Phase of operation, further comprising:

after said step (g), performing a Replay Phase of operation for said Parity Group into said File System through the steps of:

acquiring, by at least one of said BBNs, the metadata stored in said DHT server portion associated with said at least one of said BBNs, reading said data fragments from a respective block written in said at least one of said BBNs, aggregating said data fragments, storing said data fragments in a respective buffer in a structured format in accordance with said metadata, and once said respective buffer is full, committing said structured data fragments to said file system.

15. The method of claim 14, further comprising:

if during the Replay Phase of operation, data migration experiences a faulty condition, using said complete PGI to indicate the Parity Group's blocks needed for data reconstruction.

16. The method of claim 14, further comprising:

in said Replay Phase of operation, when said data fragments are replayed to the File System, decrementing said Residency Reference Structure Counts until the reference count for said respective block of said Parity Group reaches zero, and clearing the residency reference bit associated with said respective block of said Parity Group in said PGI's bitmap.

17. The method of claim 16, further comprising:

when said Residency Reference Counts reach zero for all said blocks $BBB_1$, $BBB_2$, ..., $BBB_n$, and $BBB_p$ of said Parity Group, deleting said PGI from said BBNs.

18. The method of claim 2, further comprising:

upon obtaining said PGID in said step (d) at said at least one data generating entity, recreating a copy of said initial PGI by utilizing said PGID and filling said copy of the PGI with information related to said block $BBB_1$.

19. The method of claim 2, wherein said PGI includes an information associated with each said block $BBB_1$, $BBB_2$, ..., $BBB_n$, and $BBB_p$ of said Parity Group and residency of said each block of said Parity Group indicating said BBNs containing said each of said blocks $BBB_1$, $BBB_2$, ..., $BBB_n$, and $BBB_p$.

20. The method of claim 19, wherein said PGID includes information on said PGI's residency.

21. A system for data migration between data generating entities and a File System, comprising:
- a Burst Buffer (BB) tier operatively coupled between at least one data generating entity and the File System, and configured with a plurality of Burst Buffer Nodes (BBNs) and a plurality of Non-Volatile Memory (NVM) units, wherein each NVM unit is operatively associated with a respective BBN of said plurality thereof, and wherein at least a portion of said plurality of BBNs are arranged in at least one local storage pool, said at least one data generating entity having at least one parity group buffer and being configured to compose a Parity Group to be ingested in said BB tier,
- a Parity Group Ingestion mechanism operatively coupled between said at least one data generating entity and said BB tier,
- a Parity Group Replay Engine operatively coupled between said BB tier and the File System, and
- an Addressing Mechanism operatively coupled to said at least one data generating entity, said BB tier, said Parity Group Ingestion mechanism, and said File System;

wherein said Parity Group includes:
- a plurality of data blocks BBB1, BBB2, . . . , BBBn, each of said data blocks BBB1, BBB2, . . . , BBBn, being filled with corresponding unstructured data fragments and containing metadata associated with said corresponding data fragments, and
- at least one parity block BBBp containing error correction coded data fragments contained in said data blocks BBB1, bbb2, . . . , and BBBn, and wherein said at least one data generating entity is further configured to send a "write" request for writing said Parity Group to said BB tier, and to assign a Burst Buffer Node BBN1 from said plurality of BBNs to handle the writing of said first data block BBB1;

wherein said Parity Group Ingestion mechanism is configured with said BBN1 configured to, upon receipt of said "write" request from said at least one generating entity, cooperate with said Addressing mechanism configured to generate a Parity Group Identifier (PGID) for said Parity Group and an initial Parity Group Information (PGI) containing information for said data block BBB1, to write said first data block BBB1 and said metadata associated therewith to a NVM associated with said BBN1, and to send said PGID to said at least one data generating entity;

wherein said at least one data generating entity is further configured to cooperate with said Parity Group Ingestion mechanism to:

upon receipt of said PGID from said BBN1, send a remaining at least one of said blocks BBB2, . . . , BBBn, and BBBp to a respective at least one BBN in said at least one local storage pool for temporary storage therein; and wherein each said respective at least one BBN is further configured to:

update said initial PGI to reflect the storage of each remaining at least one of said blocks BBB2 . . . , BBBn, BBBp of said Parity Group, in a respective NVM unit associated with said respective at least one of said BBN2, . . . , BBNn and BBNp, respectively, replicate said updated PGI created by said respective at least one BBN to other Burst Buffer Nodes sharing said local pool affinity with said respective at least one BBN, and save a complete updated PGI in said NVM of said each respective BBN upon completion of said Parity Group ingestion to said BB tier.

22. The system of claim 21, further configured, upon identifying of at least one failed BBN in said at least one local storage pool, to determine, using said complete updated PGI, a block of said Parity Group written in said at least one failed BBN, and to re-send said block to another BBN in said at least one local storage pool, which is free of said Parity Group's blocks.

23. The system of claim 21, wherein said at least one data generating entity is further configured to send said blocks $BBB_2$, . . . , $BBB_n$, and $BBB_p$ to their respective BBNs in parallel or sequentially.

24. The system of claim 21, further including:
- a Distributed Hash Table (DHT) server operatively coupled to said BB tier, wherein said DHT server includes a plurality of DHT portions, each DHT portion being maintained by a respective one of said plurality of BBNs,
- said DHT server being configured to store at least one DHT object in a corresponding DHT portion, wherein said at least one DHT object includes said metadata and said PGI associated with a corresponding one of said, $BBB_1$, $BBB_2$, . . . , $BBB_n$, and $BBB_p$.

25. The system of claim 24, further including:
- a Jumbo Transaction group (JTG) structure created in the memory of said DHT server, wherein said JTG structure holds a list of commands that mutate said DHT server's portions, and
- wherein said at least one DHT object is placed in said JTG structure associated with said corresponding BBN.

26. The system of claim 21, wherein said PGID resides in a metadata section within said NVM associated with said respective BBN.

27. The system of claim 24, further including:
- a Residency Reference Counts Structure coupled to said BB tier to indicate the number of active references to said at least one DHT object, wherein said Residency Reference Counts Structure is configured to cooperate with said Parity Group Ingestion mechanism to increment count for said data fragments added to said corresponding block.

28. The system of claim 27, wherein for said at least one DHT object including said PGI, said Residency Reference Counts Structure is configured as a bitmap representing said blocks added to said PGI.

29. The system of claim 28, further configured to replay said Parity Group into said File System, wherein at least one of said BBNs is configured to cooperate with said Replay Engine to acquire, during a Replay Phase of operation, a metadata stored in said corresponding DHT portion associated with said at least one BBN, to read said data fragments from said block written in said at least one BBN, to store said data fragments in a respective buffer in a structured format in accordance with said metadata, and to write said structured data fragments in said File System, once said respective buffer is full.

30. The system of claim 29, wherein during the Replay Phase of operation, said system is configured to use said complete PGI to indicate the Parity Group's blocks needed for data reconstruction if data migration experiences faulty conditions.

31. The system of claim 29, wherein, in said Replay Phase of operation, when said data fragments from said block within said at least one BBN are replayed to the File System, said Residency Reference Count Structure is configured to cooperate with said Replay Engine to decrement count till the reference count for said block of said Parity Group reaches zero, and to clear the residency reference bit associated with said Parity Group in said PGI's bitmap.

32. The system of claim 31, further configured to delete said PGI from said BBNs when residency reference counts reach zero for all said blocks, $BBB_1, BBB_2, \ldots BBB_n$, and $BBB_p$ of said Parity Group.

33. The method of claim 21, wherein said at least one data generating entity is configured to cooperate with said Addressing Mechanism to recreate a copy of said PGI by utilizing said PGID.

* * * * *